United States Patent
Bernard

(10) Patent No.: US 11,227,418 B2
(45) Date of Patent: Jan. 18, 2022

(54) SYSTEMS AND METHODS FOR DEEP LEARNING-BASED IMAGE RECONSTRUCTION

(71) Applicant: General Electric Company, Schenectady, NY (US)

(72) Inventor: Sylvain Bernard, Buc (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 287 days.

(21) Appl. No.: 16/235,046

(22) Filed: Dec. 28, 2018

(65) Prior Publication Data

US 2020/0211240 A1 Jul. 2, 2020

(51) Int. Cl.
*G06T 11/00* (2006.01)

(52) U.S. Cl.
CPC ........ *G06T 11/008* (2013.01); *G06T 2200/24* (2013.01); *G06T 2207/10072* (2013.01); *G06T 2207/10116* (2013.01); *G06T 2207/20084* (2013.01)

(58) Field of Classification Search
USPC .................................................. 382/128, 131
See application file for complete search history.

(56) References Cited

U.S. PATENT DOCUMENTS

| | | | |
|---|---|---|---|
| 7,630,533 B2 * | 12/2009 | Ruth | A61B 6/502 382/131 |
| 8,452,379 B2 | 5/2013 | DeFreitas et al. | |
| 9,401,019 B2 * | 7/2016 | Dennerlein | G06T 7/0012 |
| 9,449,403 B2 | 9/2016 | Jerebko | |
| 9,668,711 B2 * | 6/2017 | Smith | G06T 11/005 |

(Continued)

FOREIGN PATENT DOCUMENTS

| | | |
|---|---|---|
| GB | 2533632 B | 1/2018 |
| WO | 2013165396 | 11/2013 |

OTHER PUBLICATIONS

European application 19219939.6 filed Dec. 27, 2019—Search Report dated May 4, 2020, 8 pages.

(Continued)

*Primary Examiner* — Ishrat I Sherali
(74) *Attorney, Agent, or Firm* — Hanley, Flight & Zimmerman, LLC

(57) ABSTRACT

Methods, apparatus and systems for deep learning based image reconstruction are disclosed herein. An example at least one computer-readable storage medium includes instructions that, when executed, cause at least one processor to at least: obtain a plurality of two-dimensional (2D) tomosynthesis projection images of an organ by rotating an x-ray emitter to a plurality of orientations relative to the organ and emitting a first level of x-ray energization from the emitter for each projection image of the plurality of 2D tomosynthesis projection images; reconstruct a three-dimensional (3D) volume of the organ from the plurality of 2D tomosynthesis projection images; obtain an x-ray image of the organ with a second level of x-ray energization; generate a synthetic 2D image generation algorithm from the reconstructed 3D volume based on a similarity metric between the synthetic 2D image and the x-ray image; and deploy a model instantiating the synthetic 2D image generation algorithm.

12 Claims, 18 Drawing Sheets

(56) References Cited

U.S. PATENT DOCUMENTS

| | | | |
|---|---|---|---|
| 9,984,478 B2* | 5/2018 | Westerhoff | G06T 11/008 |
| 10,032,294 B2* | 7/2018 | Bernard | A61B 6/481 |
| 10,096,106 B2* | 10/2018 | Bernard | A61B 6/466 |
| 10,679,384 B2* | 6/2020 | Palma | G06T 11/006 |
| 2003/0006770 A1 | 1/2003 | Smith | |
| 2005/0135664 A1 | 6/2005 | Kaufhold et al. | |
| 2005/0220265 A1 | 10/2005 | Besson | |
| 2005/0285042 A1 | 12/2005 | Joung | |
| 2007/0206724 A1* | 9/2007 | Sakaguchi | A61B 6/504 378/62 |
| 2008/0050002 A1 | 2/2008 | Arnold | |
| 2009/0147919 A1* | 6/2009 | Goto | A61B 6/482 378/86 |
| 2011/0092793 A1 | 4/2011 | Thomson et al. | |
| 2011/0142316 A1 | 6/2011 | Wang et al. | |
| 2011/0210261 A1* | 9/2011 | Maurer, Jr. | A61B 6/025 250/393 |
| 2011/0311129 A1 | 12/2011 | Milanfar et al. | |
| 2014/0072108 A1 | 3/2014 | Rohler et al. | |
| 2014/0185896 A1 | 7/2014 | Baturin et al. | |
| 2014/0294138 A1 | 10/2014 | Jerebko | |
| 2015/0092916 A1 | 4/2015 | Baturin et al. | |
| 2015/0182181 A1* | 7/2015 | Ruth | A61B 6/502 600/425 |
| 2015/0196265 A1 | 7/2015 | Suzuki | |
| 2015/0213633 A1 | 7/2015 | Chang et al. | |
| 2015/0347682 A1 | 12/2015 | Chen et al. | |
| 2016/0183901 A1 | 6/2016 | Bernard | |
| 2016/0189376 A1* | 6/2016 | Bernard | G06T 11/006 382/132 |
| 2016/0310019 A1 | 10/2016 | Fonte et al. | |
| 2017/0024634 A1* | 1/2017 | Miao | G06N 3/04 |
| 2017/0071562 A1 | 3/2017 | Suzuki | |
| 2017/0160211 A1 | 6/2017 | Schulte et al. | |
| 2017/0248708 A1 | 8/2017 | Bordy | |
| 2018/0140265 A1 | 5/2018 | Chu et al. | |
| 2019/0102916 A1 | 4/2019 | Palma et al. | |

OTHER PUBLICATIONS

United States Patent and Trademark Office, "Non-Final Office action," issued in connection with U.S. Appl. No. 15/720,632, dated Jan. 7, 2019, 79 pages.

United States Patent and Trademark Office, "Final office action," issued in connection with U.S. Appl. No. 15/720,632, dated Jul. 11, 2019, 30 pages.

United States Patent and Trademark Office, "Advisory action," issued in connection with U.S. Appl. No. 15/720,632, dated Oct. 21, 2019, 11 pages.

European Patent Office, "European Search Report," issued in connection with European Patent Application No. 18193060.3, dated Feb. 13, 2019, 8 pages.

Abdurahman, et al., "Out-of-Plane Artifact Reduction in Tomosynthesis Based on Regression Modeling and Outlier Detection," Springer-Verlag Berlin Heidelberg, Jul. 8, 2012, pp. 729-736.

Hammernik K, et al., "A deep learning architecture for limited-angle computed tomography reconstruction," Bildverarbeitung Fur Die Medizin 2017: Algorithmen—Systeme—Anwendungen: Proceedings Des Workshops VOM 12., BIS 14., Mar. 12, 2017, pp. 92-97.

* cited by examiner

SYSTEMS AND METHODS FOR DEEP LEARNING-BASED IMAGE RECONSTRUCTION

FIELD OF THE DISCLOSURE

This disclosure relates generally to image reconstruction, and, more particularly, to systems and methods for deep learning-based image reconstruction.

BACKGROUND

Radiography is generally used for seeking abnormalities in an object of interest. A radiography image represents a projection of an object, for example an organ of a patient. In a more specific, nonlimiting, example, the organ is a breast and the images are mammographic images. Mammography has been used for decades for screening and diagnosing breast cancer. The radiography image is generally obtained by placing the object between a source emitting X-rays and a detector of X-rays, so that the X-rays attain the detector having crossed the object. The radiography image is then constructed from data provided by the detector and represents the object projected on the detector in the direction of the X-rays.

In the case of mammography, an experienced radiologist may distinguish radiological signs indicating a potential problem, for example microcalcification, masses, or other opacities. However, in a two-dimensional (2D) projection image, super position of the tissues may hide lesions, but in no case is their actual position known in the object of interest, the practitioner not having any information on the position of the radiological sign in the projection direction.

Tomosynthesis is used in order to address these problems. In tomosynthesis, a three-dimensional (3D) representation of an organ may be obtained as a series of successive slices. The slices are reconstructed from projections of the object of interest under various angles. To do this, the object of interest is generally placed between a source emitting X-rays and a detector of X-rays. The source and/or the detector are mobile, so that the direction of projection of the object on the detector may vary (e.g., over an angular range of 30 degrees, etc.). Several projections of the object of interest are thereby obtained under different angles, from which a three-dimensional representation of the object may be reconstructed, generally by a reconstruction method, for example.

For each projection, the radiation doses of the X-rays are naturally less than those used for standard mammography. For example, by noting as D the radiation dose by standard mammography, and as N the number of projections used for tomosynthesis, the radiation dose used for each projection is generally of the order of D/N.

While both standard mammography and tomosynthesis are currently used by radiologists, each technique has advantages. Standard mammography forms better than tomosynthesis in imaging microcalcifications. This may be due to the higher energy and dose used to obtain any individual standard mammography image and also that the reconstruction process in tomosynthesis tends to blur edges of the already small calcifications. Tomosynthesis is superior in imaging of spiculated masses as the reconstruction in the tomosynthesis properly locates the mass within the organ as well as super position and back projection errors from objects of interest within the organ.

While radiologists may acquire both standard mammography and tomosynthesis images to leverage the advantages of each technique, these imaging processes are typically performed sequentially with the radiologist switching between the imaging techniques.

In recent years, digital breast tomosynthesis (DBT) and contrast-enhanced digital breast tomosynthesis (CE-DBT) have proved to be effective cancer detection techniques. DBT creates a three-dimensional (3D) image of the breast using x-rays. By taking multiple x-ray pictures of each breast from many angles, a computer can generate a 3D image used to detect any abnormalities. A critical part of the DBT/CE-DBT process is image reconstruction as it directly impacts the content of the data that the radiologists will review to determine any diagnosis. To reconstruct the image, algorithms trained and used to reduce the noise and any streak lines. Despite the complexity of the algorithms, the DBT process typically results in non-perfect image reconstruction.

Figure 1:
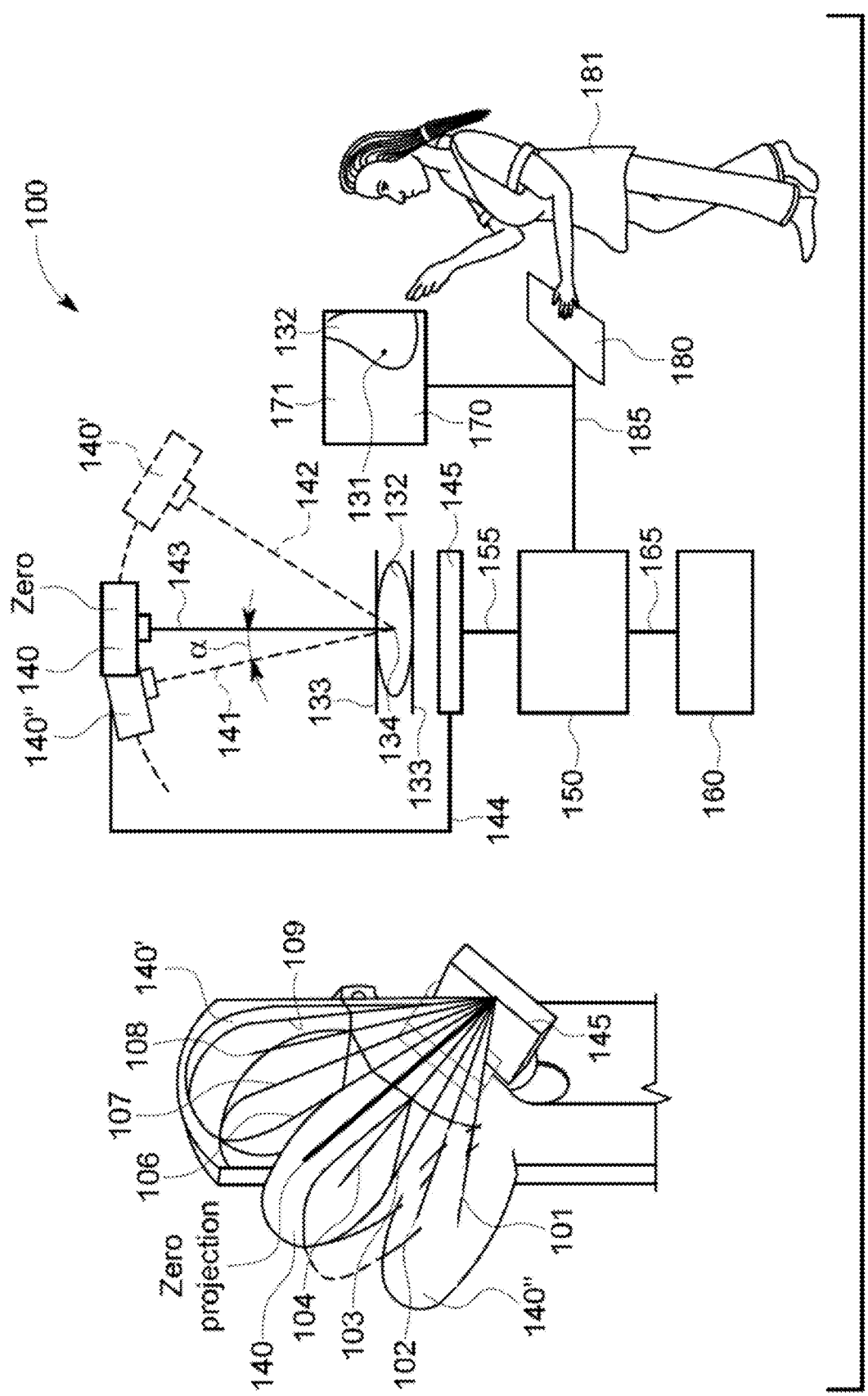
FIG. 1 illustrates an example imaging system for obtaining one or more images of an object of interest.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in contact with another part means that there is no intermediate part between the two parts.

BRIEF SUMMARY

Certain examples provide methods and systems for deep learning based image reconstruction.

Certain examples provide at least one computer-readable storage medium including instructions that, when executed, cause at least one processor to at least: obtain a plurality of two-dimensional (2D) tomosynthesis projection images of an organ by rotating an x-ray emitter to a plurality of orientations relative to the organ and emitting a first level of x-ray energization from the emitter for each projection image of the plurality of 2D tomosynthesis projection images; reconstruct a three-dimensional (3D) volume of the organ from the plurality of 2D tomosynthesis projection images; obtain an x-ray image of the organ with a second level of x-ray energization; generate a synthetic 2D image generation algorithm from the reconstructed 3D volume based on a similarity metric between the synthetic 2D image and the x-ray image; and deploy a model instantiating the synthetic 2D image generation algorithm.

Certain examples provide at least one computer-readable storage medium including instructions that, when executed, cause at least one processor to at least: obtain a plurality of two-dimensional (2D) tomosynthesis projection images of an organ by rotating an x-ray emitter to a plurality of orientations relative to the organ and emitting a first level of x-ray energization from the emitter for each projection image of the plurality of 2D tomosynthesis projection images; obtain an x-ray image of the organ with a second level of x-ray energization; generate a volume reconstruction algorithm from the plurality of 2D tomosynthesis projection images based on a similarity metric between the volume reprojection and the x-ray image; and deploy a model instantiating the volume reconstruction algorithm.

Certain examples provide at least one computer-readable storage medium including instructions that, when executed, cause at least one processor to at least: obtain a plurality of two-dimensional (2D) tomosynthesis projection images of an organ by rotating an x-ray emitter to a plurality of orientations relative to the organ and emitting a first level of x-ray energization from the emitter for each projection image of the plurality of projection images; obtain an x-ray image of the organ with a second level of x-ray energization; generate an image enhancement algorithm from a central tomosynthesis projection from the plurality of 2D tomosynthesis projection images based on a similarity metric between an output of the image enhancement algorithm and the x-ray image; and deploy a model instantiating the image enhancement algorithm.

Certain examples provide at least one computer-readable storage medium including instructions that, when executed, cause at least one processor to at least: obtain a plurality of two-dimensional (2D) tomosynthesis projection images of an organ by rotating an x-ray emitter to a plurality of orientations relative to the organ and emitting a first level of x-ray energization from the emitter for each projection image of the plurality of projection images; degrade the plurality of 2D projection images to form a set of degraded tomosynthesis projection images that appear to have been acquired with lower level of x-ray energization than the first level of x-ray energization; generate an image enhancement algorithm from the set of degraded tomosynthesis projection images that tends to minimize a similarity metric between an output of the image enhancement algorithm and the original projections; and deploy a model instantiating the image enhancement algorithm.

Certain examples provide at least one computer-readable storage medium including instructions that, when executed, cause at least one processor to at least: obtain a plurality of two-dimensional (2D) tomosynthesis projection images of an organ by rotating an x-ray emitter to a plurality of orientations relative to the organ and emitting a first level of x-ray energization from the emitter for each projection image of the plurality of projection images; reconstruct an original three-dimensional (3D) volume of the organ from the plurality of 2D tomosynthesis projection images; degrade the plurality of 2D projection images to form a set of degraded tomosynthesis projection images that appear to have been acquired with lower level of x-ray energization than the first level of x-ray energization; generate a volume reconstruction algorithm from the set of degraded tomosynthesis projection images that tends to minimize a similarity metric between an output of the volume reconstruction algorithm and the original 3D volume; and deploy a model instantiating the volume reconstruction algorithm.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules, units, engines, and/or systems shown in the attached figures may represent the hardware that operates based on software or hard-wired instructions, the software that directs hardware to perform the operations, or a combination thereof.

As used herein, the term "mapping" indicates translating a position of a location in an object being imaged to a corresponding location in one or more images obtained of the object. Alternatively or in addition, mapping can refer to a correlation between common points in a plurality of images or views such that a point in a first image is mapped to the same point in other related images such that their location coordinates are correlated when forming a synthetic two-dimensional image, three-dimensional volume, etc. For example, each element (e.g. a pixel, a voxel, etc.) in a 3D object has a location on a coordinate system. Mapping the elements in the 3D object indicates translating a data point from the 3D object to a corresponding data point in a generated 2D or 3D image.

As used herein, the term "projection" or "projection image" indicates an image obtained from emission of x-rays from a particular angle or view. A projection can be thought of as a particular example of mapping in which a set of projection images are captured from different angles of a 3D object and mapped or combined/fused to reconstruct a volume and/or create a synthetic 2D image. Each projection image is captured relative to a central projection (e.g. base projection, straight-on projection, zero angle projection, etc.). The resulting image from the projections is either a 3D reconstructed image that is approximately identical to the original 3D object or a synthetic 2D image that merges each projection together and benefits from the information in each view.

As used herein, the term "acquisition geometry" is a particular path or movement of an x-ray source with respect to a 3D object (e.g., detector) to obtain a series of 2D projections.

While certain examples are described below in the context of medical or healthcare workplaces, other examples can be implemented outside the medical environment.

In many different applications, deep learning techniques have utilized learning methods that allow a machine to be given raw data and determine the representations needed for data classification. Deep learning ascertains structure in data sets using back propagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

Deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

Deep learning operates on the understanding that many datasets include high level features which include low level features. While examining an image, for example, rather than looking for an object, it is more efficient to look for edges which form motifs which form parts, which form the object being sought. These hierarchies of features can be found in many different forms of data such as speech and text, etc.

An example use of deep learning techniques in the medical field is mammography. Mammography is used to screen for breast cancer and other abnormalities. Traditionally, mammograms have been formed on x-ray film. However, more recently, flat panel digital imagers have been introduced that acquire a mammogram in digital form, and thereby facilitate analysis and storage of the acquired images. Further, substantial attention and technological development have been dedicated toward obtaining three-dimensional images of the breast. Three-dimensional (3D) mammography is also referred to as digital breast tomosynthesis (DBT). Two-dimensional (2D) mammography is full-field digital mammography, and synthetic 2D mammography produces 2D pictures derived from 3D data by combining individual enhanced slices (e.g., 1 mm, 2 mm, etc.) of a DBT volume. Breast tomosynthesis systems reconstruct a 3D image volume from a series of two-dimensional (2D) projection images, each projection image obtained at a different angular displacement of an x-ray source. The reconstructed 3D image volume is typically presented as a plurality of slices of image data, the slices being geometrically reconstructed on planes parallel to the imaging detector.

Learned observable features include objects and quantifiable regularities learned by the machine during supervised learning. A machine provided with a large set of well classified data is better equipped to distinguish and extract the features pertinent to successful classification of new data.

A deep learning machine can properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine has been trained to operate according to a specified threshold, etc.), the machine can be deployed for use (e.g., testing the machine with "real" data, etc.). During operation, neural network classifications can be confirmed or denied (e.g., by an expert user, expert system, reference database, etc.) to continue to improve neural network behavior. Thus, parameters for classification that determine neural network behavior can be updated based on ongoing interactions. In certain examples, the neural network can provide direct feedback to another process. In certain examples, the neural network outputs data that is buffered (e.g., via the cloud, etc.) and validated before it is provided to another process.

Deep learning machines using convolutional neural networks (CNNs) can be used for data analysis. Stages of CNN analysis can be used to evaluate and/or otherwise estimate height of a pixel (i,j) in image projection data, presence of a lesion in image data using CAD, etc.

Deep learning machines can provide computer aided detection support to improve image analysis, as well as computer aided diagnosis for a patient. Supervised deep learning can help reduce susceptibility to false classification, for example. Deep learning machines can utilize transfer learning when interacting with physicians to counteract the small dataset available in the supervised training. These deep learning machines can improve their computer aided diagnosis over time.

Example Systems and Associated Methods

FIG. 1 illustrates an example imaging system 100 for obtaining one or more images of an object of interest. The example system 100 includes an x-ray beam source 140 facing the detector 145. The x-ray beam source or emitter 140 and the detector 145 are connected by an arm 144. An object of interest 132 can be placed between the detector 145 and the source 140. In the example of FIG. 1, the x-ray source 140 moves in an arc above a single detector 145. The detector 145 and a plurality of positions of the x-ray source 140' and 140" following an arc (see dashed line) are shown with dashed/solid lines and in a perspective partial view. In the arrangement shown in the example of FIG. 1, the detector 145 is fixed at the shown position and only the x-ray source 140 moves. The angle a is a projection angle enclosed by the zero-orientation and any other orientation such as 141 and 142. Using this configuration, multiple views of the breast (e.g., the object of interest 132) tissue can be acquired via the at least one x-ray source 140. The projection of lowest a or the projection closest to the zero-orientation is named the central projection or zero projection by approximation.

Still referring to FIG. 1, on the left side is shown a partial perspective view of the imaging system 100 including the detector 145 and the x-ray source 140. The different positions of the x-ray source 140, 140' and 140" are broadly depicted to illustrate the movement of the x-ray source 140. There are nine different projection views 101, 102, 102, 103, 104, 106, 107, 108, 109 including the zero projection 105 indicated as straight lines, which all point to the center of the detector 145.

The patient (not shown) is positioned in front of the mammography arm. To obtain, for example, a mediolateral oblique (MLO) view, the mammography technologist 181 sets the angle for the desired projection (30 degrees to 60 degrees, wherein 45 degree represents the preferred zero projection shown in the perspective view of FIG. 1). During routine screening mammography, the angled MLO view is preferred over a lateral 90-degree projection because more of the breast tissue can be imaged.

The object of interest 132 shown in display unit 170 is a breast compressed by compression paddles 133, which help ensure uniform compression and immobilization of the breast during the radiation exposure for optimal image quality. The breast 132 includes, for example, a punctual object 131 as a calcification, which is located in the zero orientation 143, which is perpendicular to the detector 145 plane. The user may review calcifications or other clinical relevant structures for diagnosis, for example. The display 170 depicts a 2D mammography view, in which primarily the middle portion of the breast 132 can be reviewed.

The detector 145 and the x-ray source 140 form an acquisition unit, which is connected via a data acquisition line 155 to a processing unit 150. The processing unit 150 includes a memory unit 160, which may be connected via an archive line 165, for example.

A user such as a health professional may input control signals via a user interface 180. Such signals are transferred from the user interface 180 to the processing unit 150 via the signal line 185. Using the example system 100, an enhanced 2D projection image can be obtained that appears to be a 2D mammogram. Based on this high quality image, a radiologist and/or other user can identify clinical signs relevant for breast screening. Further, historical, stored 2D mammograms can be displayed for comparison with the a new 2D projection image acquired through tomosynthesis. Tomosynthesis images may be reviewed and archived, and a CAD system, a user, etc., can provide 3D marks. A height map of punctual objects or other objects obtained from image data can be combined with height information provided based on 3D marks by a CAD system, indicated by a user through a 3D review, etc. Further, the user may decide to archive 2D full-volume images and/or other images are archived. Alternatively, or in addition, saving and storing of the images may be done automatically.

In certain examples, the memory unit 150 can be integrated with and/or separate from the processing unit 150. The memory unit 160 allows storage of data such as the 2D enhanced projection image and/or tomosynthesis 3D images. In general, the memory unit 160 can include a computer-readable medium, such as a hard disk or a CD-ROM, diskette, a ROM/RAM memory, DVD, a digital source, such as a network or the Internet, etc. The processing unit 150 is configured to execute program instructions stored in the memory unit 160, which cause the computer to perform methods and/or implement systems disclosed and described herein. One technical effect of performing the method(s) and/or implementing the system(s) is that the x-ray source may be less used, since the enhanced 2D projection image can replace a known 2D mammogram, which is usually obtained using additional x-ray exposures to get high quality images.

Figure 2:
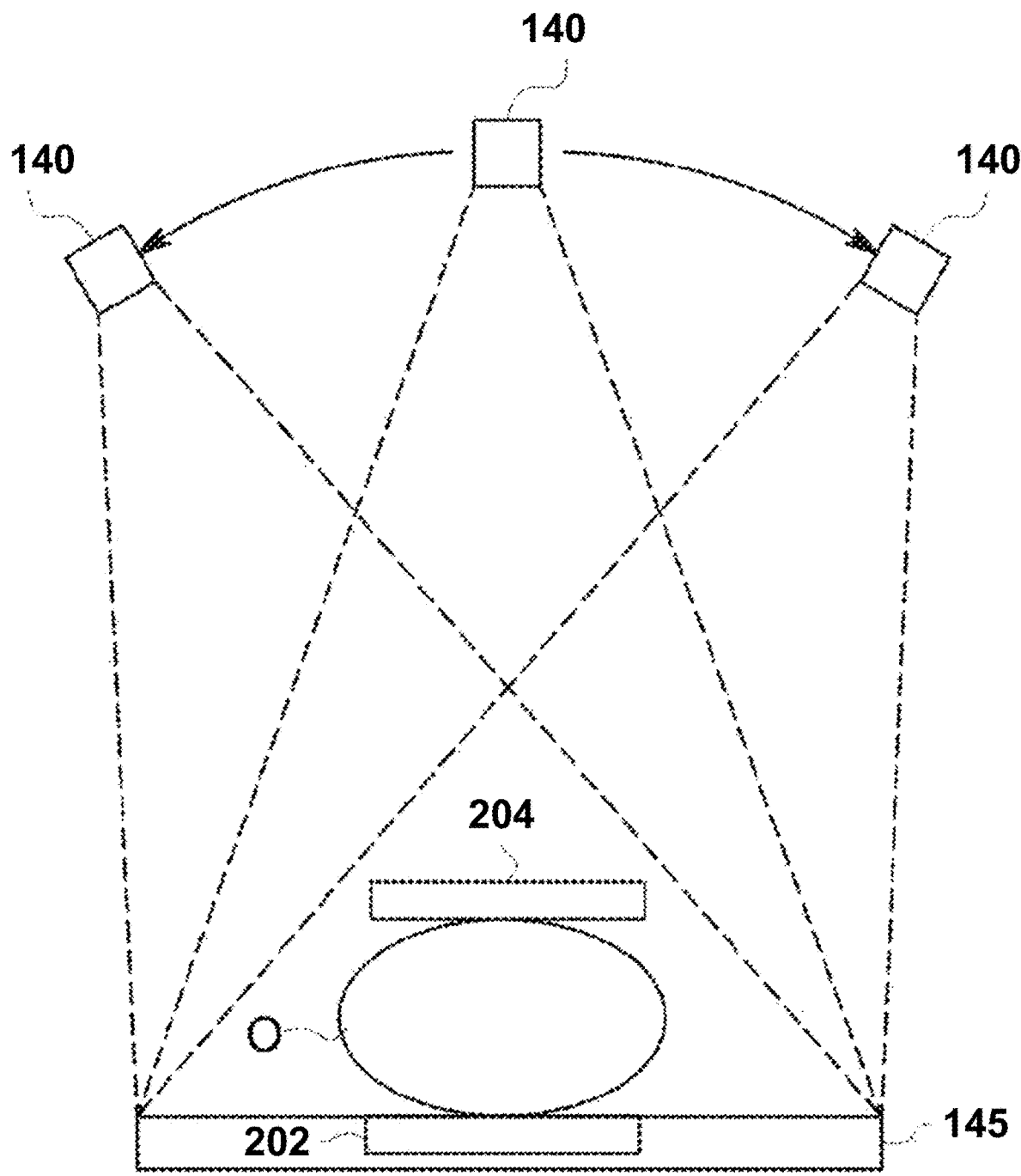
FIG. 2 illustrates example movement of the source/emitter relative to an organ.

FIG. 2 illustrates example movement of the source/emitter 140 relative to an organ O. As the emitter 140 is rotated about the organ, the emitter 140 may further include beam shaping (not depicted) to direct the X-rays through the organ to the detector 145. As shown in the example of FIG. 2, the object O is positioned between a lower support 202 and a compression support 204 to compress the object, and the detector 145 is integrated into the lower support 202. In other examples, the object/organ can be positioned with respect to the detector 145 without supports 202 and/or 204. The emitter 140 can be rotatable about the organ O to a plurality of orientations with respect to the organ O, for example. In an example, the emitter 140 may rotate through a total arc of 30 degrees relative to the organ O or may rotate 30 degrees in each direction (clockwise and counterclockwise) relative to the organ O. It will be recognized that these arcs of rotation are merely examples and not intended to be limiting on the scope of the angulation which may be used.

It will be recognized that the emitter 140 is positionable to a position or orthogonal to one or both of the organ O and the detector 145. In this orthogonal or center position, a full field digital mammography (FFDM) may be acquired, particularly in an example configuration in which a single emitter 140 and detector 145 are used to acquire both the FFDM image as well as digital breast tomosynthesis (DBT) projection images. The DBT projection images are acquired at various angles of the emitter 140 about the organ O. Various imaging work flows can be implemented using the example system 100. In one example, the FFDM image is obtained at the position orthogonal to the organ, and the DBT projection images are acquired at various angles relative to the organ O, including a DBT projection image acquired at an emitter 140 position orthogonal to the organ O. During reconstruction, the DBT projection images and the FFDM image are used to reconstruct the 3D volume of the organ, for example.

In an example, the DBT projection images are acquired at various angles of the emitter 140 relative to the organ. However, a DBT projection image is not acquired at the position of the emitter 140 orthogonal to the organ. Instead, an FFDM image is acquired. The 3D volume of the organ is reconstructed using both the DBT projection images as well as the FFDM image.

In another example, the DBT projection images are acquired at various angles of the emitter 140 relative to the organ, including at a position orthogonal to the organ. An FFDM image is acquired orthogonally to the organ. During reconstruction of the 3D volume of the organ, the FFDM image replaces the DBT projection image acquired with the emitter 140 orthogonal to the organ O.

In another example, DBT projection images are acquired about the organ at various angles of the emitter 140 relative to the organ. As previously noted, the level of energization of each individual DBT projection image is typically lower than that of the X-ray energy level at which the FFDM is acquired. In this example, a dynamic energization is used throughout the acquisition of the DBT projection images such that the DBT projection images at the greatest angles relative to the position orthogonal to the organ have the lowest X-ray energization, and the X-ray energization used at acquisition of each subsequent DBT projection image as the angulation of the emitter 140 relative to the organ approaches the orthogonal increases until the DBT projection image acquired orthogonal to the organ approaches or is equal to the X-ray energy at which an FFDM image is acquired.

An FFDM image, also referred to as a digital mammography image, allows a full field of an object (e.g., a breast, etc.) to be imaged, rather than a small field of view (FOV) within the object. The digital detector 145 allows full-field imaging of the target object O, rather than necessitating movement and combination of multiple images representing portions of the total object.

In certain examples, a synthetic 2D image can be generated from tomosynthesis acquisition data, and the resulting synthetic 2D image is at least as good in diagnostic quality as an FFDM image obtained of the object. To achieve this diagnostic quality resolution in the synthetic 2D image, machine learning can be applied to the tomosynthesis data, for example. However, deep learning algorithms require a large amount of truthed data to optimize internal parameters of the network model, and collecting curated truthed data is painful and costly. Thus, in certain examples, combination cases including DBT and 2D mammography images can be leveraged to train a learning algorithm (e.g., a deep learning algorithm, other machine learning algorithm, etc.). Then, combination image data from potentially thousands of cases from multiple sites can be leveraged to train the network model, for example. An FFDM acquisition can serve as a "truthed image" to verify that the learning network has generated a synthetic 2D image that mirrors and/or otherwise closely resembles an FFDM image (e.g., within a certain artifact/noise limit and/or other error tolerance, etc.). In certain examples, the synthetic 2D image output by the network model can be enriched with volume information (e.g., spiculated masses, etc.) to produce an enriched image that outperforms an FFDM image.

Thus, in certain examples, an organ and/or other object of interest can be imaged by obtaining a plurality of 2D tomosynthesis projection images of the organ by rotating an x-ray emitter 140 to a plurality of orientations relative to the organ and emitting a first level of x-ray energization from the emitter 140 for each projection image of the plurality of projection images. A 3D volume of the organ is then reconstructed from the plurality of tomosynthesis projection images. An x-ray image of the organ is obtained with a second level of x-ray energization. A learning network model is employed to produce a synthetic 2D image generation algorithm instantiated in the network model by making correlations from the 3D volume and/or 2D projections that tend to reduce or minimize a similarity metric between the synthetic 2D image and an obtained x-ray image (e.g., an FFDM image and/or enriched FFDM image, etc.), for example.

In certain examples, each plane of the 3D volume is matched with an image geometry of the 2D x-ray image. Learning by the deep learning and/or other machine learning network is facilitated by reconstructing the 3D volume using a conic reconstruction (e.g., in plane objects are magnified compared to their real size as if the source was situated at an infinite distance from the detector plane). Using the conic reconstruction, a selection process occurs in parallel, and geometric transformations are not required. The 3D volume is reconstructed according to the source position of the combo-FFDM acquisition (e.g., which might differ from the DBT central projection), for example.

In certain examples, areas of the 3D volume can be extracted, and the synthetic 2D image can be enhanced with the areas extracted from the 3D volume to enrich the mapping of the synthetic 2D image to the 3D volume with the location of the extracted areas. The synthetic 2D image provided by the network can be enriched with information visible only in the 3D volume, such as spiculated masses, etc., to outperform FFDM.

In certain examples, an organ of a patient is imaged by obtaining a plurality of 2D tomosynthesis projection images of the organ by rotating the x-ray emitter 140 to a plurality of orientations relative to the organ and emitting a first level of x-ray energization from the emitter 140 for each projection image of the plurality of projection images. An x-ray image of the organ can then be obtained with a second level of x-ray energization. A volume reconstruction algorithm is learned by a model from the tomosynthesis projections that tend to minimize or otherwise reduce a similarity metric between the volume reprojection and the x-ray image.

In certain examples, an organ and/or other target is imaged by obtaining a plurality of 2D tomosynthesis projection images of the organ by rotating an x-ray emitter 140 to a plurality of orientations relative to the organ and emitting a first level of x-ray energization from the emitter 140 for each projection image of the plurality of projection images. An x-ray image of the organ is obtained with a second level of x-ray energization. An image enhancement algorithm is learned by the learning network from a central tomosynthesis projection that tends to reduce or minimize a similarity metric between the algorithm output and the x-ray image, for example. During a testing phase, only tomosynthesis projections are acquired (no combo). The image enhancement algorithm is applied to the set of tomosynthesis projections. An enhanced volume is reconstructed from the enhanced projections. A synthesized 2D image is computed from the enhanced projections/volume, for example.

In certain examples, an organ can be imaged by obtaining a plurality of 2D tomosynthesis projection images of the organ by rotating an x-ray emitter 140 to a plurality of orientations relative to the organ and emitting a first level of x-ray energization from the emitter 140 for each projection image of the plurality of projection images. In certain examples, the projections images can be degraded as if the images were acquired with lower dose. An image enhancement algorithm is learned by the network from the degraded tomosynthesis projections that tend to minimize or otherwise reduce a similarity metric between the algorithm output and the original projections. During a testing phase, a low-dose tomosynthesis acquisition is performed. The image enhancement algorithm is applied to the set of tomosynthesis projections. An improved volume is reconstructed from the enhanced projections. A synthesized 2D image is computed from the enhanced projections/volume, for example.

In certain examples, an organ is imaged by obtaining a plurality of 2D tomosynthesis projection images of the organ by rotating an x-ray emitter 140 to a plurality of orientations relative to the organ and emitting a first level of x-ray energization from the emitter 140 for each projection image of the plurality of projection images. An original 3D volume of the organ is reconstructed from a plurality of tomosynthesis projection image. The projection images can be degraded as if they were acquired with lower dose. A volume reconstruction algorithm is learned by/instantiated in the neural network from the degraded projections that tend to minimize or reduce a similarity metric between the reconstruction output and the original volume, for example.

In certain examples, higher dose images are obtained by leveraging the FFDM image of a plurality of acquisitions that include multiple image acquisitions. In certain examples, a machine learning algorithm optimizes and/or otherwise improves its internal parameters (e.g., of the neural network model, etc.) to minimize or otherwise reduce a similarity metric between a synthetic 2D image output and a combination FFDM image.

Prior synthetic 2D images were perceived to be of lower image quality than FFDM images. Consequently, women underwent both DBT and FFDM acquisitions, which doubles the radiation dose delivered to the patient. By generating a synthetic 2D image that is of at least as good image quality as an FFDM image, certain examples provide technological improvement to synthetic 2D image generation, reduce patient radiation exposure, decrease imaging and analysis time, and facilitate adoption of a full 3D protocol for image acquisition, processing, and review.

In prior synthetic 2D image generation, a central projection is considered as a baseline that is enhanced using information from other projections. However, this approach has many drawbacks. For example, the baseline is noisy because the central projection is a low-dose DBT projection image. The noise leads to undesired noise in the final synthetic 2D image. Additionally, with a new generation of DBT systems being developed, a number of projections is likely to increase to avoid ripple artifacts. A total dose budget will remain unchanged, but a dose per projection will increase. Consequently, relying on the central projection as a baseline is likely to be challenged.

An FFDM-like image can serve as a useful, reliable baseline. However, designing an algorithm to generate, from a DBT acquisition, an image that looks like an FFDM acquisition is a challenging task. Certain examples leverage machine learning to generate such an image. Thus, a machine learning algorithm can process one or more projection images to render the image(s) as a synthetic FFDM image (e.g., denoising the projection image(s), etc.).

Figure 3:
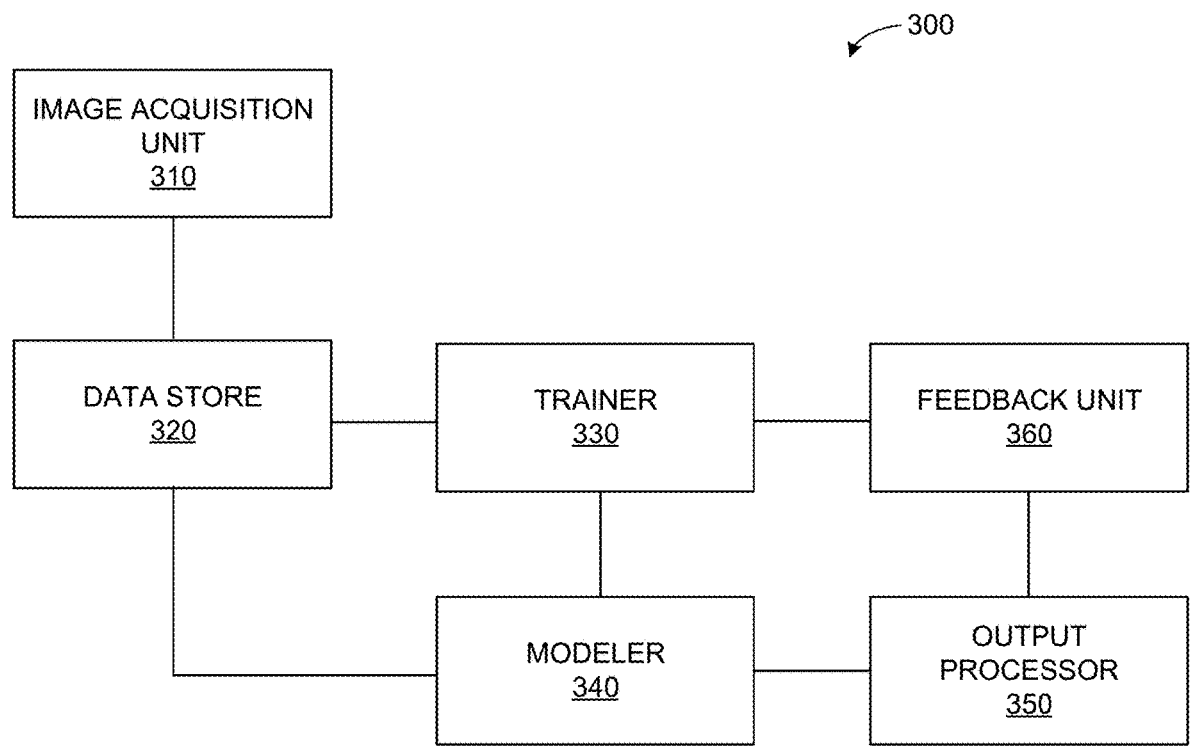
FIG. 3 illustrates an example image processing system.

FIG. 3 illustrates an example image processing system 300 including an image acquisition unit 310, a data store 320, a model trainer 330, a modeler 340, an output processor 350, and a feedback unit 360. In certain examples, the image acquisition unit 310 includes the imaging system 100 and/or communicates with the imaging system 100 to receive and/or otherwise obtain image data (e.g., an FFDM image, DBT image data, other image data, etc.). Image data is stored in the data store 320 (e.g., in a database, data structure, hard drive, solid state memory, flash memory, other computer memory, etc.).

The trainer 330 and modeler 340 receive image and/or other data from the data store 320. The trainer 330 trains and tests a deep learning network and/or other machine learning network (e.g., a convolutional neural network, recursive neural network, random forest, etc.) to be deployed as a model in the modeler 340. The trained network model is used by the modeler 340 to process image data from the data store 320 to generate a synthetic image of an object that closely resembles an actual, captured image (e.g., an FFDM image, etc.) of that object. Image input to train and test the generated network includes tomosynthesis image data, reconstructed volume image data, 2D mammogram data, projection image data, FFDM image data, etc.

The modeler 340 uses the deployed artificial intelligence model (e.g., neural network, random forest, etc.) to process incoming image data and form a synthetic image of sufficient diagnostic quality to resemble an actual acquired digital image (e.g., an FFDM image, etc.). The synthetic image generated by the modeler 340 is provided to the output processor 350 to generate an image output for display, storage, processing by another system (e.g., for computer-aided diagnosis to detect lesion, tumor, etc.), communication to another device (e.g., a tablet or smartphone, etc.), etc.

Feedback from the image output is captured by the feedback unit 360 and can be provided to the trainer 330, which can leverage the feedback to improve the artificial intelligence model. The feedback can be used to train and/or test the model and can be used to periodically trigger a regeneration of the model by the trainer 330 to be deployed to the modeler 340.

Figure 4:
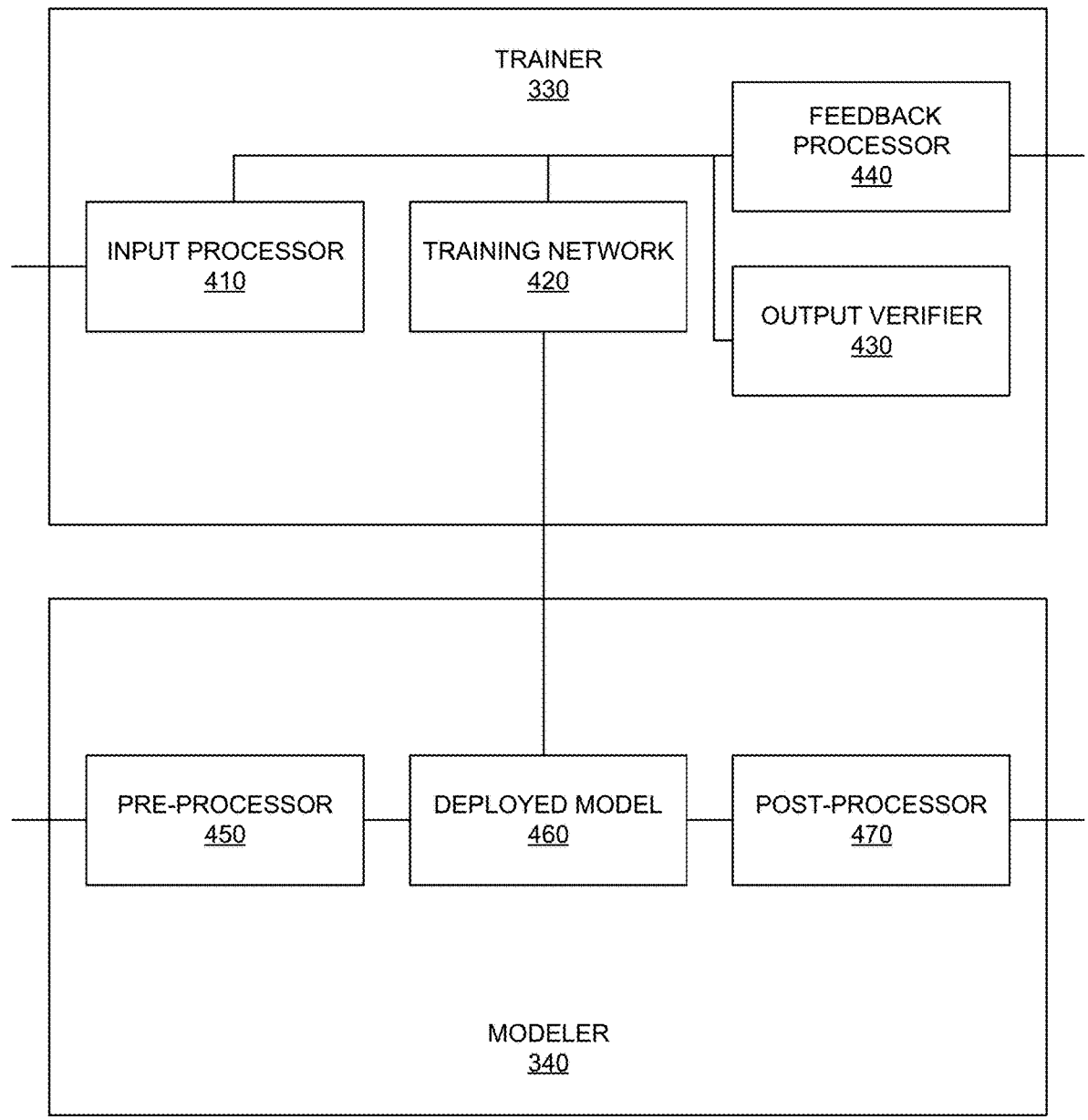
FIG. 4 illustrates an example implementation of the trainer and the modeler of the example image processing system of FIG. 3.

FIG. 4 illustrates an example implementation of the trainer 330 and the modeler 340. As shown in the example of FIG. 4, the trainer 330 includes an input processor 410, a training network 420, an output verifier 430, and a feedback processor 440. The example modeler 340 includes a pre-processor 450, a deployed model 460, and a post-processor 470. In the example of FIG. 4, input, such as an FFDM image, DBT image data, other image data, etc., is provided to the input processor 410, which prepares the data to be input to the training network 420. For example, the data can be filtered, supplemented, and/or otherwise altered to prepare the image data (e.g., image data pixel and/or voxel values, etc.) to be input to the network 420.

The example training network 420 processes the input data from the input processor 410 and generates an output, which is verified by the output verifier 430. Thus, the training network 420 develops connections and processes image data to dynamically form a learning algorithm that takes the input image data and generates a synthetic image that has sufficient diagnostic quality to match or exceed the diagnostic quality of a full digital image, such as an FFDM image, etc. The output verified 430 can compare the synthetic image data output from the training network 420 with truthed FFDM image data provided from the data store 320 to verify the accuracy of the network 420, for example. If the network 420 output is not accurate (e.g., is not of sufficient diagnostic quality), the network 420 can be modified (e.g., by adjusting network weight(s), altering node connections, etc.) to update the network 420 and re-process input data to generate another set of output synthetic image data for evaluation, for example. Once the output image quality of the training network 420 has been verified by the output verifier 430, the training network 420 can be used to generate and deploy a network model 460 for the modeler 340.

Periodically, feedback can be provided to the feedback processor 440, which processes the feedback and evaluates whether or not to trigger an update or regeneration of the network 420. For example, if the synthetic image output of the deployed network model 460 continues to be accurate, then no update may be warranted. However, if the synthetic image output of the network model 460 becomes inaccurate, then regeneration or other update of the network 429 may be triggered to deploy an updated network model 460 (e.g., based on additional data, new constraints, updated configuration, etc.), for example.

The deployed network model 460 is used by the modeler 340 to process input image data and convert the image data into a synthetic image (e.g., a synthetic 2D image, etc.).

Input data, such as from the data store 320, etc., is prepared by the pre-processor 450 to be fed into the network model 460 (e.g., a deep learning network model, machine learning model, other network model, etc.). For example, input image data can be adjusted by the pre-processor 450 to adjust contrast, brightness, level, artifact/noise, etc., before the image data is provided to the network model 460. The model 460 processes the image data from the pre-processor 450 to construct synthetic image data. The synthetic image data output from the model 460 is post-processed by the post-processor 470, which can clean up, organize, and/or otherwise modify the data output from the model 460 to form a synthetic 2D image. In certain examples, the post-processor 470 can verify and/or otherwise perform a quality check on the output image data before the synthetic image is stored, displayed, conveyed to another system, etc.

Figure 5:
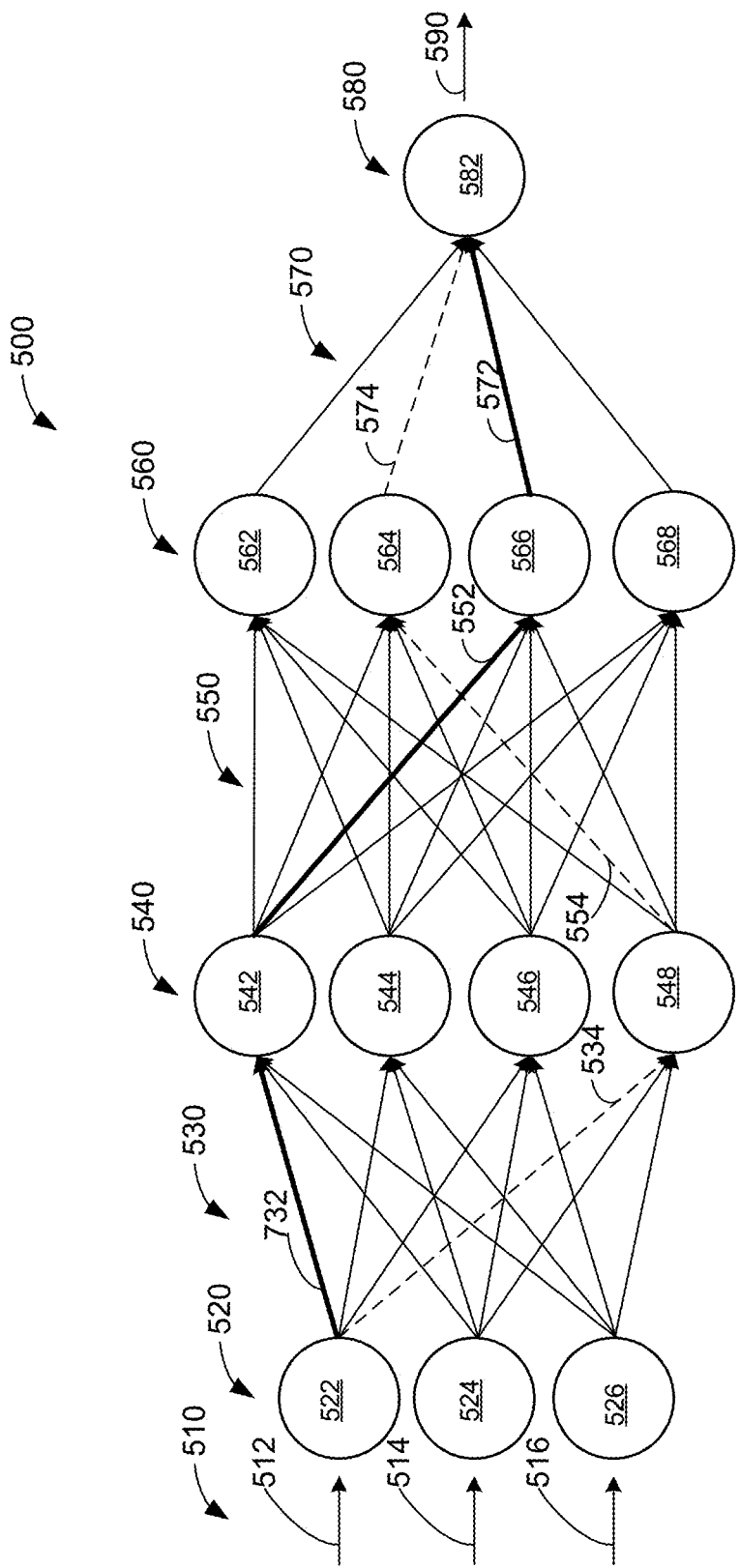
FIG. 5 is a representation of an example deep learning neural network.

FIG. 5 is a representation of an example deep learning neural network 500. The example neural network 500 includes layers 520, 540, 560, and 580. The layers 520 and 540 are connected with neural connections 540. The layers 540 and 560 are connected with neural connections 550. The layers 560 and 580 are connected with neural connections 570. Data flows forward via inputs 512, 514, 516 from the input layer 520 to the output layer 580 and to an output 590.

The layer 520 is an input layer that, in the example of FIG. 5, includes a plurality of nodes 522, 524, 526. The layers 540 and 560 are hidden layers and include, the example of FIG. 5, nodes 542, 544, 546, 548, 562, 564, 566, 568. The neural network 500 may include more or less hidden layers 540 and 560 than shown. The layer 580 is an output layer and includes, in the example of FIG. 5, a node 582 with an output 590. Each input 512-516 corresponds to a node 522-526 of the input layer 520, and each node 522-526 of the input layer 520 has a connection 530 to each node 542-548 of the hidden layer 540. Each node 542-548 of the hidden layer 540 has a connection 550 to each node 562-568 of the hidden layer 560. Each node 562-568 of the hidden layer 560 has a connection 570 to the output layer 580. The output layer 580 has an output 590 to provide an output from the example neural network 500.

Of connections 530, 550, and 570 certain example connections 532, 552, 572 may be given added weight while other example connections 534, 554, 574 may be given less weight in the neural network 500. Input nodes 522-526 are activated through receipt of input data via inputs 512-516, for example. Nodes 542-548 and 562-568 of hidden layers 540 and 560 are activated through the forward flow of data through the network 500 via the connections 530 and 550, respectively. Node 582 of the output layer 580 is activated after data processed in hidden layers 540 and 560 is sent via connections 570. When the output node 582 of the output layer 580 is activated, the node 582 outputs an appropriate value based on processing accomplished in hidden layers 540 and 560 of the neural network 500.

Figure 6:
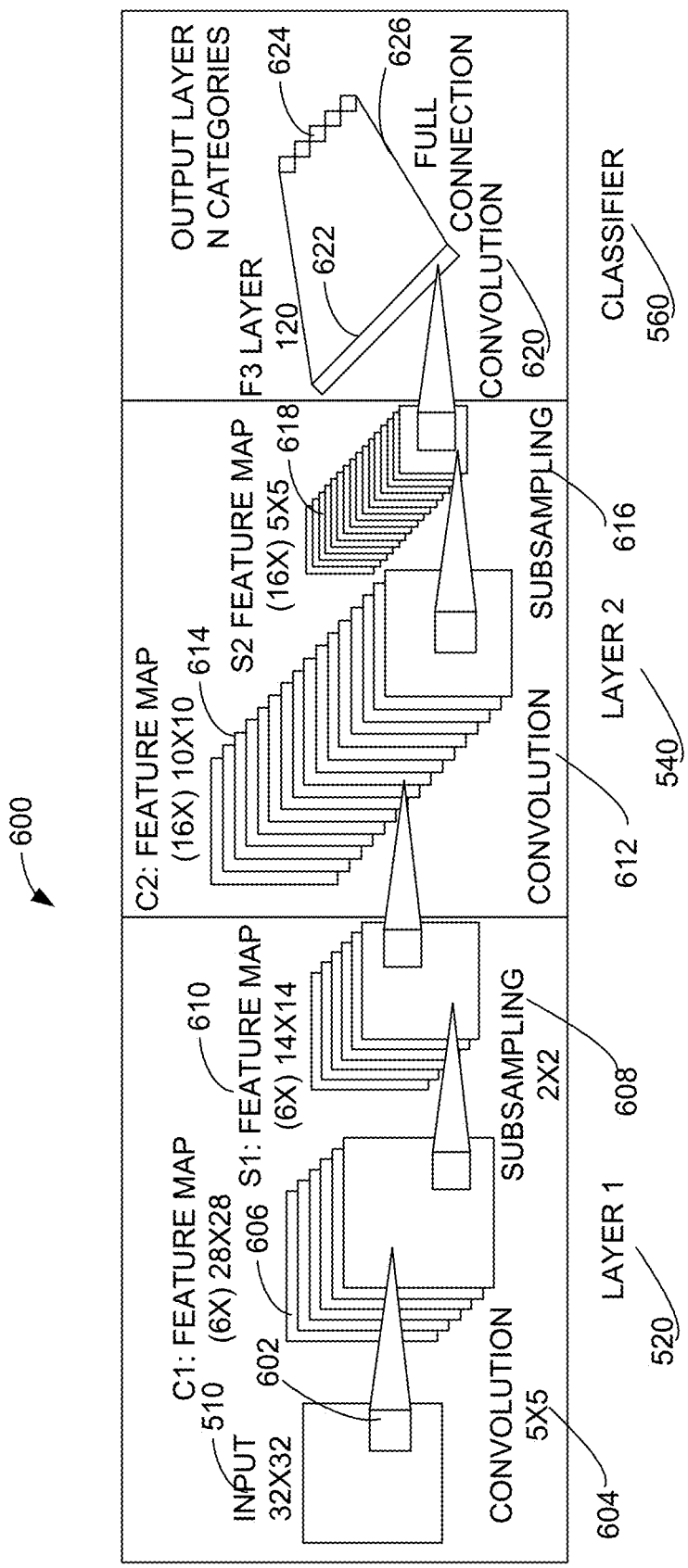
FIG. 6 illustrates a particular implementation of the example neural network of FIG. 5 as a convolutional neural network.

FIG. 6 illustrates a particular implementation of the example neural network 500 as a convolutional neural network 600. As shown in the example of FIG. 6, an input 510 is provided to the first layer 520 which processes and propagates the input 510 to the second layer 540. The input 510 is further processed in the second layer 540 and propagated to the third layer 560. The third layer 560 categorizes data to be provided to the output layer 580. More specifically, as shown in the example of FIG. 6, a convolution 604 (e.g., a 5×5 convolution, etc.) is applied to a portion or window (also referred to as a "receptive field") 602 of the input 510 (e.g., a 32×32 data input, etc.) in the first layer 520 to provide a feature map 606 (e.g., a (6×) 28×28 feature map, etc.). The convolution 604 maps the elements from the input 610 to the feature map 606. The first layer 520 also provides subsampling (e.g., 2×2 subsampling, etc.) to generate a reduced feature map 610 (e.g., a (6×) 14×14 feature map, etc.). The feature map 610 undergoes a convolution 612 and is propagated from the first layer 520 to the second layer 540, where the feature map 610 becomes an expanded feature map 614 (e.g., a (16×) 10×10 feature map, etc.). After subsampling 616 in the second layer 540, the feature map 614 becomes a reduced feature map 618 (e.g., a (16×) 4×5 feature map, etc.). The feature map 618 undergoes a convolution 620 and is propagated to the third layer 560, where the feature map 618 becomes a classification layer 622 forming an output layer of N categories 624 with connection 626 to the convoluted layer 622, for example.

Figure 7:
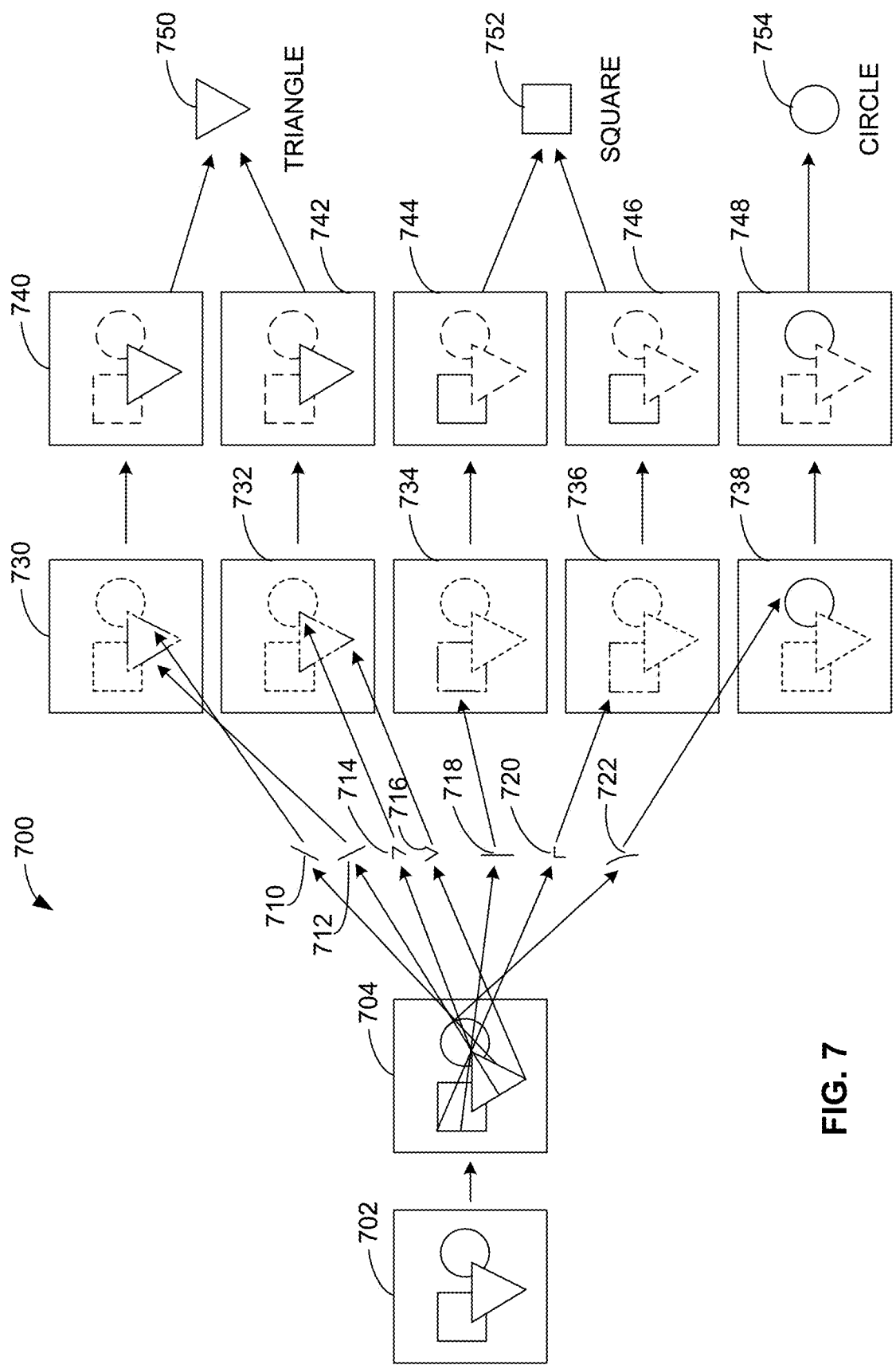
FIG. 7 is a representation of an example implementation of an image analysis convolutional neural network.

FIG. 7 is a representation of an example implementation of an image analysis convolutional neural network 700. The convolutional neural network 700 receives input image data 702 and abstracts the image data in a convolution layer 704 to identify learned features 710-722. In a second convolution layer 730, the image data is transformed into a plurality of images 730-738 in which the learned features 710-722 are each accentuated in a respective sub-image 730-738. The images 730-738 are further processed to focus on the features of interest 710-722 in images 740-748. The resulting images 740-748 are then processed through a pooling layer which reduces the size of the images 740-748 to isolate portions 750-754 of the images 740-748 including the features of interest 710-722. Outputs 750-754 of the convolutional neural network 700 receive values from the last non-output layer and classify the image based on the data received from the last non-output layer. In certain examples, the convolutional neural network 700 may contain many different variations of convolution layers, pooling layers, learned features, and outputs, etc.

Figure 8:
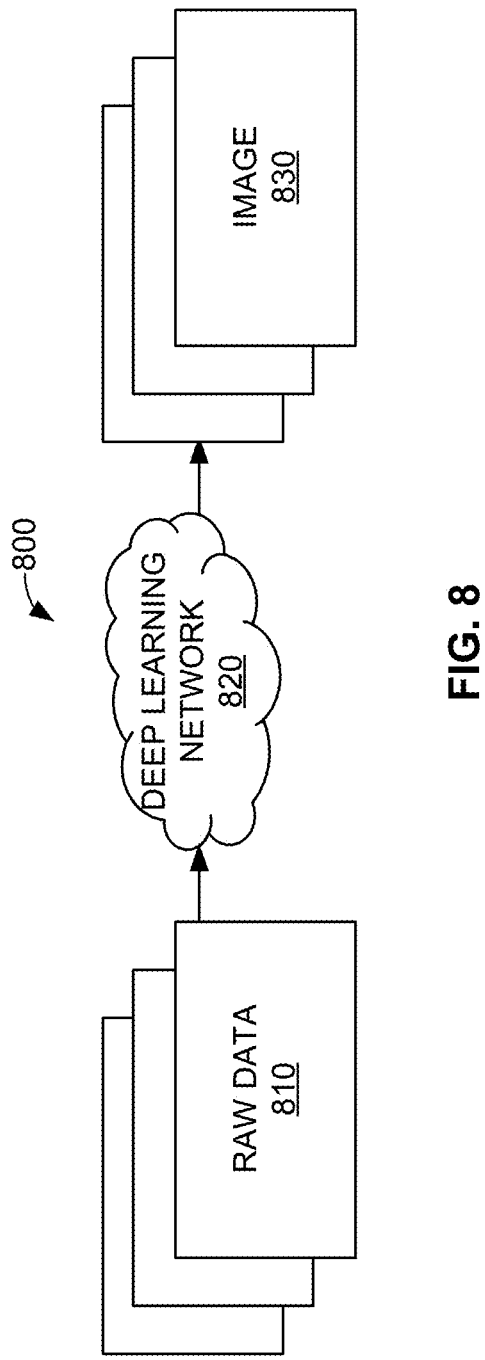
FIG. 8 illustrates an example configuration to apply a deep learning network to process and/or otherwise evaluate an image.

FIG. 8 illustrates an example configuration 800 to apply a deep learning network to process and/or otherwise evaluate an image. Deep learning can be applied to a variety of processes including image acquisition, image reconstruction, image analysis/diagnosis, etc. As shown in the example configuration 800 of FIG. 8, raw data 810 (e.g., raw data 810 such as sonogram raw data, etc., obtained from an imaging scanner such as an x-ray, computed tomography, ultrasound, magnetic resonance, etc., scanner) is fed into a deep learning network 820. The deep learning network 820 processes the data 810 to correlate and/or otherwise combine the raw image data 810 into a resulting image 830 (e.g., a "good quality" image and/or other image providing sufficient quality for diagnosis, etc.). The deep learning network 820 includes nodes and connections (e.g., pathways) to associate raw data 810 with a finished image 830. The deep learning network 820 can be a training deep learning network (e.g., the training network 420) that learns the connections and processes feedback to establish connections and identify patterns, for example. The deep learning network 820 can be a deployed deep learning network (e.g., the deployed network model 460) that is generated from a training network and leverages the connections and patterns established in the training network to take the input raw data 810 and generate the resulting image 830, for example.

Once the DLN 820 is trained and produces good images 830 from the raw image data 810, the network 820 can continue the "self-learning" process and refine its performance as it operates. For example, there is "redundancy" in the input data (raw data) 810 and redundancy in the network 820, and the redundancy can be exploited.

If weights assigned to nodes in the DLN 820 are examined, there are likely many connections and nodes with very low weights. The low weights indicate that these connections and nodes contribute little to the overall performance of the DLN 820. Thus, these connections and nodes are redundant. Such redundancy can be evaluated to reduce redundancy in the inputs (raw data) 810. Reducing input 810 redundancy can result in savings in scanner hardware, reduced demands on components, and also reduced exposure dose to the patient, for example.

In deployment, the configuration 800 forms a package 800 including an input definition 810, a trained network 820, and an output definition 830. The package 800 can be deployed and installed with respect to another system, such as an imaging system, analysis engine, etc.

Figure 9:
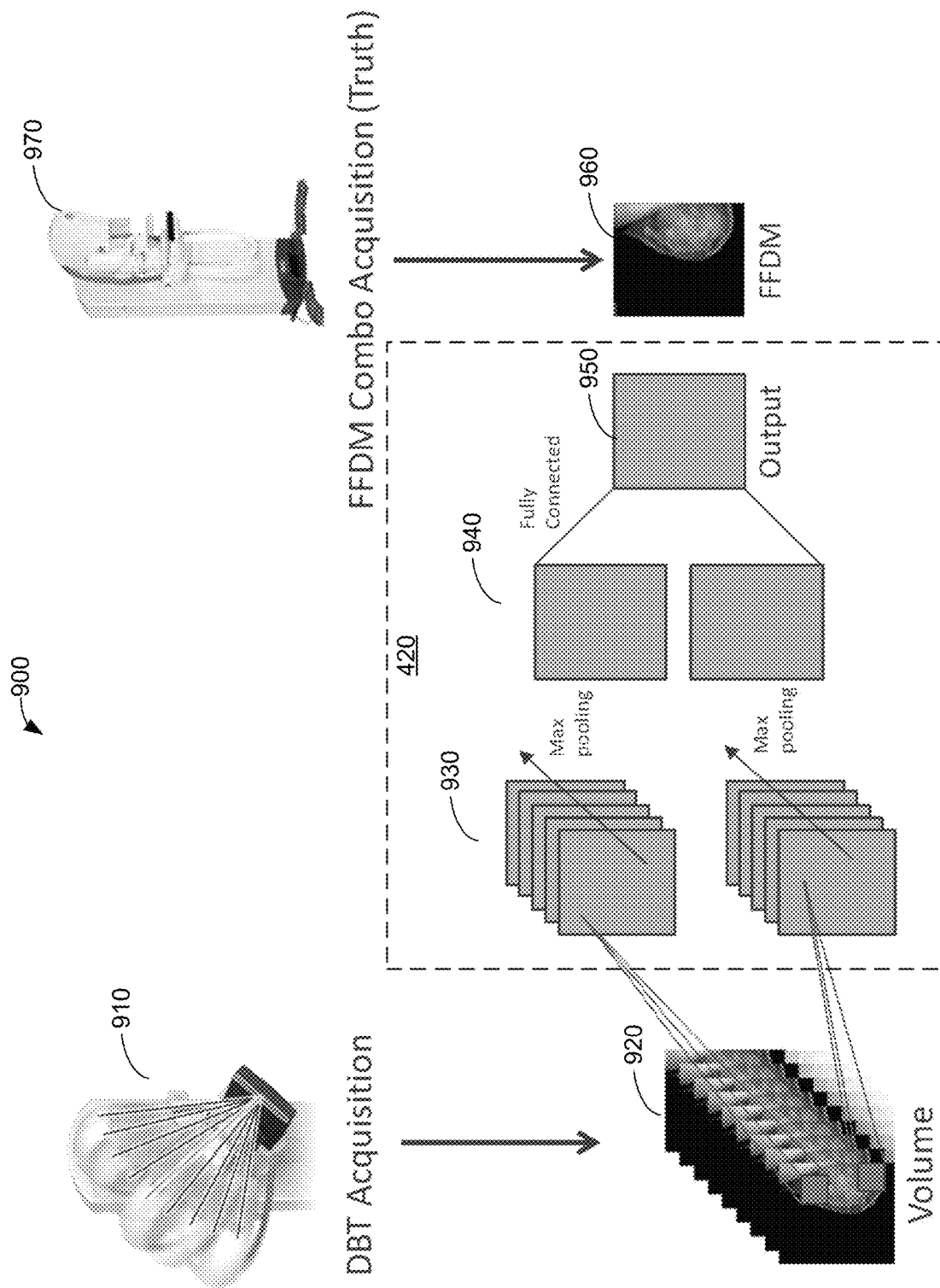
FIG. 9 illustrates an example training of the training network of the example of FIG. 5 using a tomosynthesis acquisition to provide volume image data.

FIG. 9 illustrates an example training 900 of the training network 420 using a DBT acquisition 910 to provide volume image data 920. The volume image data 920 is provided as input to the training network 420 which includes one or more max pooling layers 930 and one or more fully connected layers 940 to generate an output 950. The output 950 is compared to an FFDM image 960 obtained from a truthed FFDM combo acquisition 970. Network parameters are learned to reduce or minimize error between the FFDM image 960 and the output 950 of the network 420. For example, an error between the output image 950 and the FFDM truthed image 960 can be quantified as an error measurement or similarity metric such as follows:

$$\text{Error} = \Sigma_{Training\_Set} \Sigma_{x,y}[\text{Output}(x,y) - \text{FFDM}(x,y,)]^2 \quad \text{(Eq. 1).}$$

Figure 10:
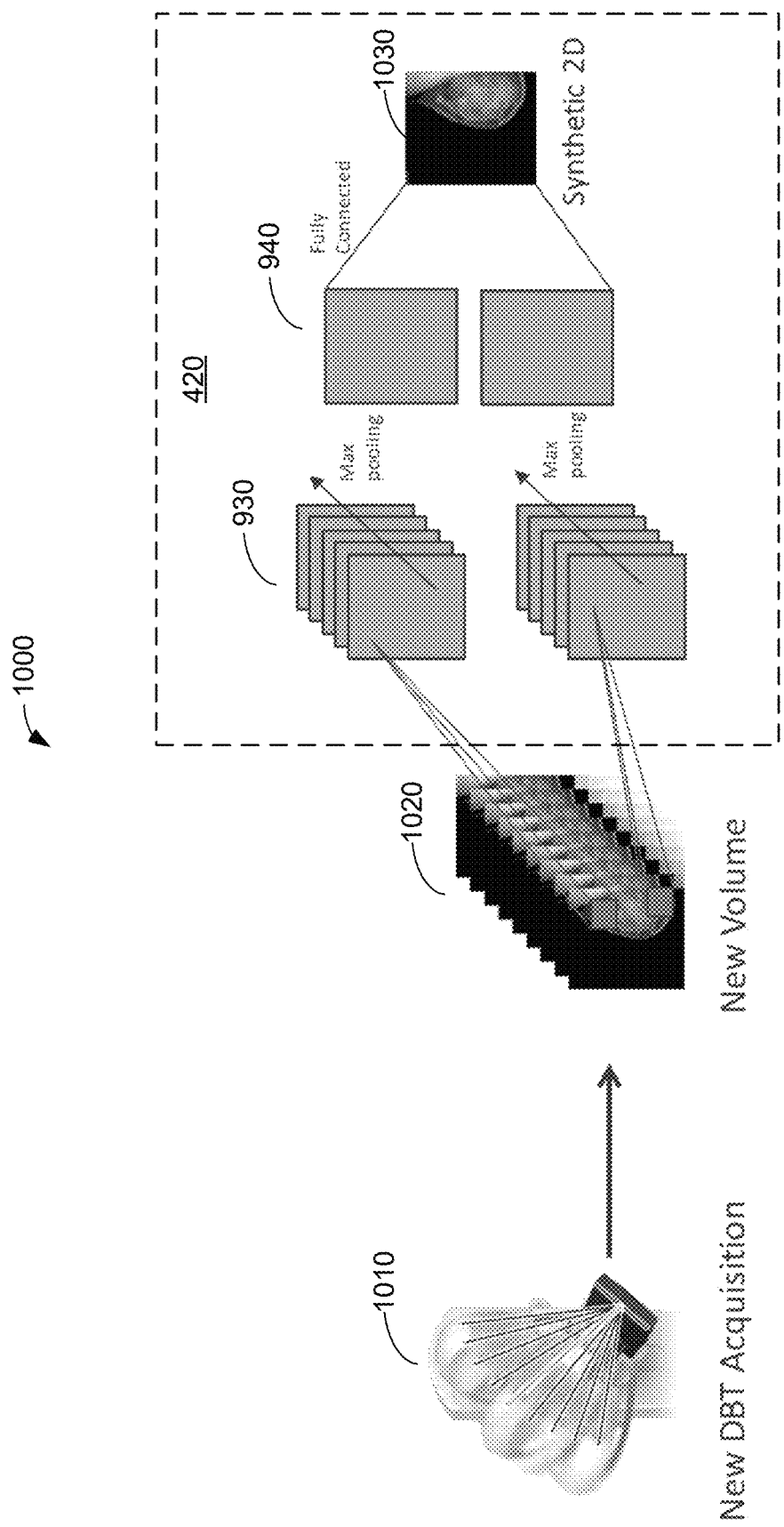
FIG. 10 illustrates an example testing of the training network of the example of FIG. 5.

As shown in FIG. 10, once the output image 950 is compared to the truthed FFDM image 960 with a similarity metric of approximately zero and/or less than a certain threshold value (e.g., less than 0.5, less than 0.05, less than 1%, etc.), then the network 420 is considered trained and can be tested. Until the error threshold is satisfied, the network 420 can continue to be trained and network parameters modified to dynamically form an image processing algorithm instantiated in the network 420. The trained network is tested using an additional DBT acquisition 1010 used to extract a new volume of images 1020 to provide to the trained network 420 to generate a synthetic 2D image 1030 as an output 1030 of the layers of the network 420 (e.g., including max pooling 930 and fully connected 940 layers, etc.). The synthetic image 1030 can be evaluated to help ensure the accuracy of the trained network 420. If the test image evaluation satisfies the error threshold/similarity metric (e.g., the same error threshold/similarity metric for FIG. 9 set by Equation 1 or a tighter threshold for testing, etc.), then the trained network 420 can be used to generate a model to be deployed as the deployed network model 460.

While example implementations of the example system 300 of FIG. 3 are illustrated in FIGS. 4-10, one or more of the elements, processes and/or devices illustrated in FIGS. 3-10 may be combined, divided, re-arranged, omitted, eliminated and/or implemented in any other way. For example, while elements of FIGS. 3-10 are illustrated separately, in certain examples FIGS. 3-10 can be combined and implemented as a single system accommodating a plurality of graphic elements such as voxels, pixels, etc., for 2D and/or 3D image generation. In certain examples one or more of the example image acquisition unit 310, data store 320, trainer 330, modeler 340, output processor 350, feedback unit 360, and/or, more generally, the example system 300 of FIGS. 3-10 may be implemented by hardware, software, firmware and/or any combination of hardware, software and/or firmware. Thus, for example, any of the example image acquisition unit 310, data store 320, trainer 330, modeler 340, output processor 350, feedback unit 360, and/or, more generally, the example system 300 of FIGS. 3-10 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image acquisition unit 310, data store 320, trainer 330, modeler 340, output processor 350, feedback unit 360, and/or, more generally, the example system 300 of FIGS. 3-10 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 300 of FIGS. 3-10 may include one or more elements, processes and/or devices in addition to, or instead of, those illustrated in FIGS. 3-10, and/or may include more than one of any or all of the illustrated elements, processes and devices.

Flowcharts representative of example machine readable instructions for implementing the example system 300 of FIGS. 3-10 are shown in FIGS. 11-15. In this example, the machine readable instructions comprise a program for execution by a processor such as the processor 1612 shown in the example processor platform 1600 discussed below in connection with FIGS. 11-15. The program may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 11-15, many other methods of implementing the example system 300 may alternatively be used. For example, the order of execution of the blocks may be changed, and/or some of the blocks described may be changed, eliminated, or combined.

As mentioned above, the example processes of FIGS. 11-15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11-15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 11:
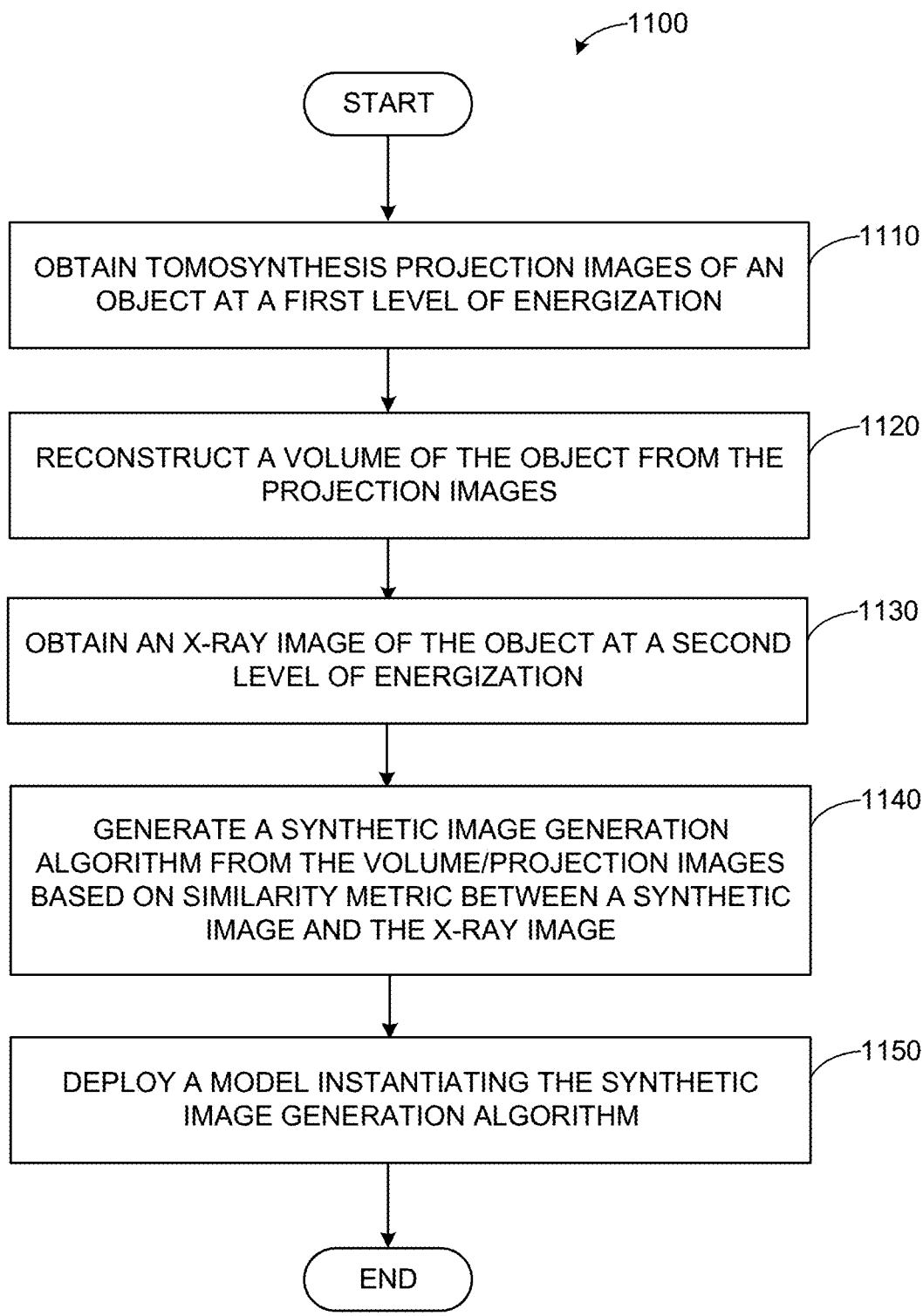
FIGS. 11-15 show flowcharts representative of example machine readable instructions for implementing the example system(s) of FIGS. 1-10.

FIG. 11 is a flowchart representative of an example method 1100 to image an object, such as an organ of a patient, etc. At block 1110, a plurality of projection images are obtained of the organ and/or other object at a first level of energization. For example, a plurality of 2D tomosynthesis projection images are obtained of the organ by rotating the x-ray emitter 140 to a plurality of orientations relative to the organ and emitting a first level of x-ray energization from the emitter 140 for each projection image of the plurality of projection images.

At block 1120, a volume of the object is reconstructed from the projection images. For example, a 3D volume of the organ can be reconstructed from the plurality of 2D tomosynthesis projection images.

At block 1130, an x-ray image is obtained of the object at a second level of x-ray energization. For example, an x-ray image, such as an FFDM image, etc., can be obtained of the organ using a greater level of x-ray energization than the level used to obtain the projection images.

In certain examples, the x-ray image is registered to fit within a geometry (e.g., an acquisition geometry) of the tomosynthesis projection images. In certain examples, the x-ray image and the plurality of tomosynthesis projection images are obtained during a same compression of the organ (e.g., during a same compression of a patient's breast, etc.). In certain examples, the plurality of 2D tomosynthesis projection images and the x-ray image are obtained with a detector 145 that receives x-rays emitted from the x-ray emitter 140 by applying a dynamic range correction factor to the plurality of 2D projection images and/or the x-ray image to adjust for and/or otherwise correct noise that may be introduced in the projection images and/or the x-ray image. In certain examples, each plane of the reconstructed 3D volume matches a geometry of the x-ray image.

At block 1140, a synthetic image generation algorithm is generated from the volume and/or projection images based on a similarity metric between the volume/projection images and the x-ray image. For example, a synthetic 2D image generation algorithm is generated from the volume and/or projections that tends to minimize or otherwise reduce the similarity metric between a resulting synthetic 2D image and the x-ray image.

For example, the volume and x-ray image can be analyzed and compared such that each plane of the 3D volume matches with a geometry of the x-ray image. In certain examples, the volume is reconstructed using a conic reconstruction in which in plane objects are magnified compared to their actual size. Thus, an underlying selection process is parallel and does not require geometric transformation. The volume can be reconstructed according to a source position of a combo-FFDM acquisition (which might differ from a DBT central projection), for example.

In certain examples, each pixel of the synthetic 2D image is mapped to at least one voxel in the 3D volume, and the synthetic 2D image is presented via a graphical user interface (GUI) provided on a graphical display. A user selection of an object of interest in the x-ray image can be received and used to identify at least one plane through the 3D volume. The one or more identified planes can be presented on the graphical display. In certain examples, the synthetic 2D image can be enhanced with areas extracted from the 3D volume. A mapping of the synthetic 2D image to the 3D volume can be enriched with the location(s) of the extracted areas, for example.

At block 1150, the generated algorithm is deployed in a model for synthetic image generation. For example, the synthetic image generation algorithm is deployed in a model 460 to generate synthetic images.

In certain examples, generation algorithm includes extracting areas of the 3D volume, enhancing the synthetic 2D image with areas extracted from the 3D volume, and enriching the mapping of the synthetic 2D image to the 3D volume with the location of the extracted areas. In certain examples, the synthetic 2D image provided by the network 460 can be enriched with information visible in the volume as spiculated masses to outperform FFDM.

Figure 12:
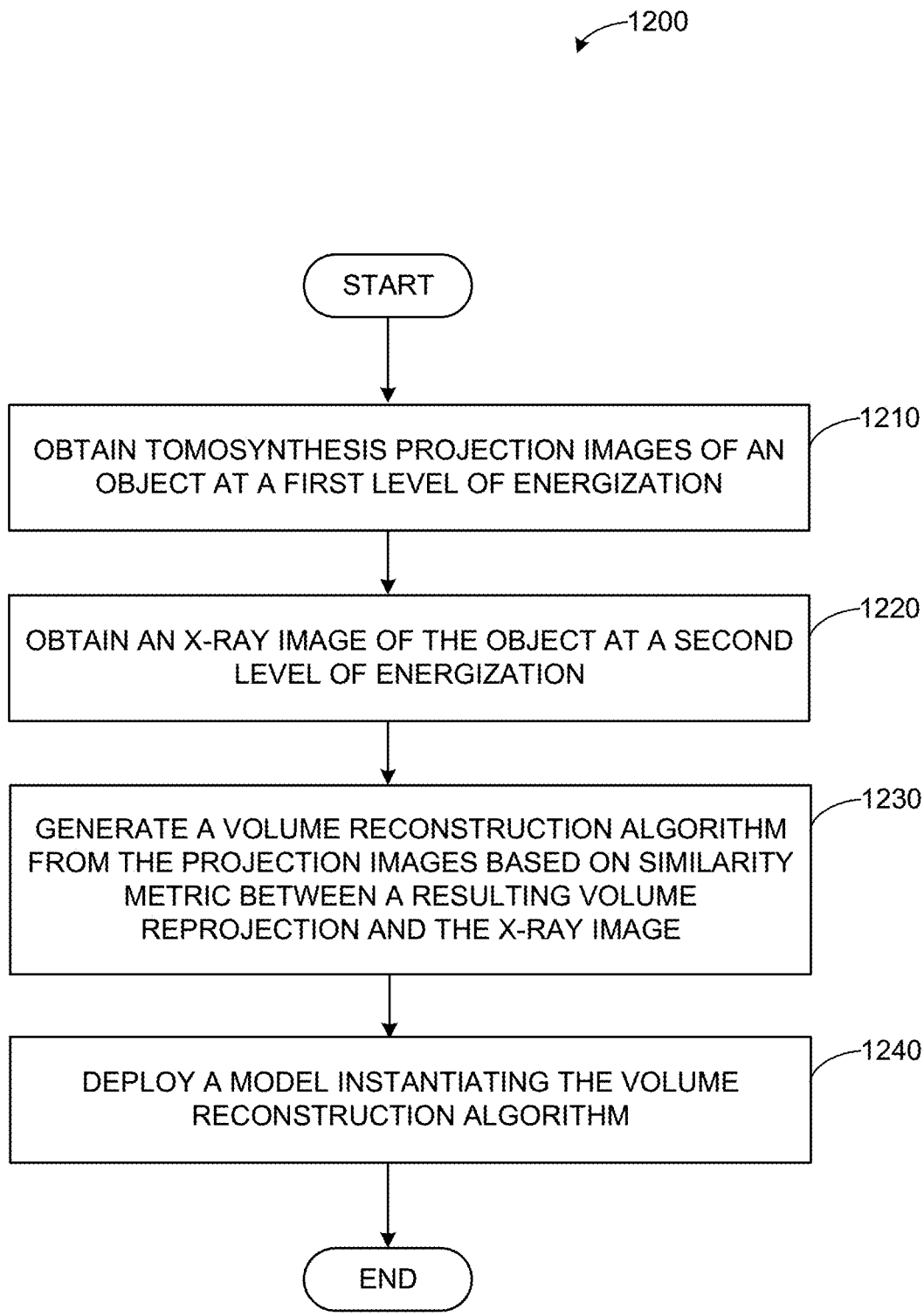

FIG. 12 is a flowchart representative of an example method 1200 to image an object, such as an organ of a patient, etc. At block 1210, a plurality of projection images are obtained of the organ and/or other object at a first level of energization. For example, a plurality of 2D tomosynthesis projection images are obtained of the organ by rotating the x-ray emitter 140 to a plurality of orientations relative to the organ and emitting a first level of x-ray energization from the emitter 140 for each projection image of the plurality of projection images.

At block 1220, an x-ray image is obtained of the object at a second level of x-ray energization. For example, an x-ray image, such as an FFDM image, etc., can be obtained of the organ using a greater level of x-ray energization than the level used to obtain the projection images.

At block 1230, a volume reconstruction algorithm is generated from the projection images based on a similarity metric between the a resulting volume reprojection and the x-ray image. For example, a volume reconstruction algorithm is generated from the projections that tends to minimize or otherwise reduce the similarity metric between a resulting volume reprojection and the x-ray image.

For example, the volume and x-ray image can be analyzed and compared such that each plane of the 3D volume matches with a geometry of the x-ray image. In certain examples, the volume is reconstructed using a conic reconstruction in which in plane objects are magnified compared to their actual size. Thus, an underlying selection process is parallel and does not require geometric transformation. The volume can be reconstructed according to a source position of a combo-FFDM acquisition (which might differ from a DBT central projection), for example.

At block 1240, the generated algorithm is deployed in a model for synthetic image generation. For example, the volume reconstruction algorithm is deployed in a model 460 to generate volume reprojections from tomosynthesis projection images.

Figure 13A:
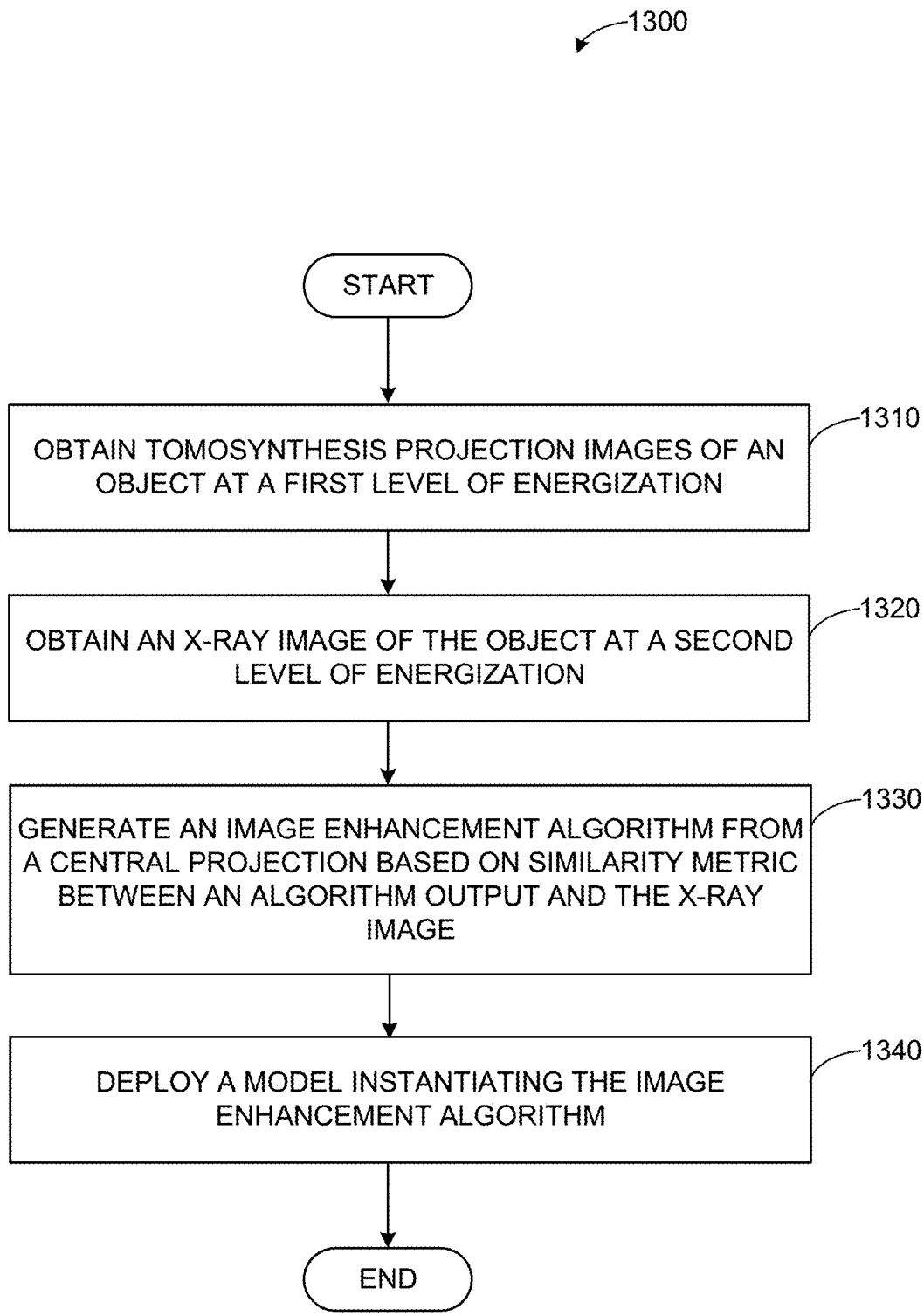
Figure 13B:
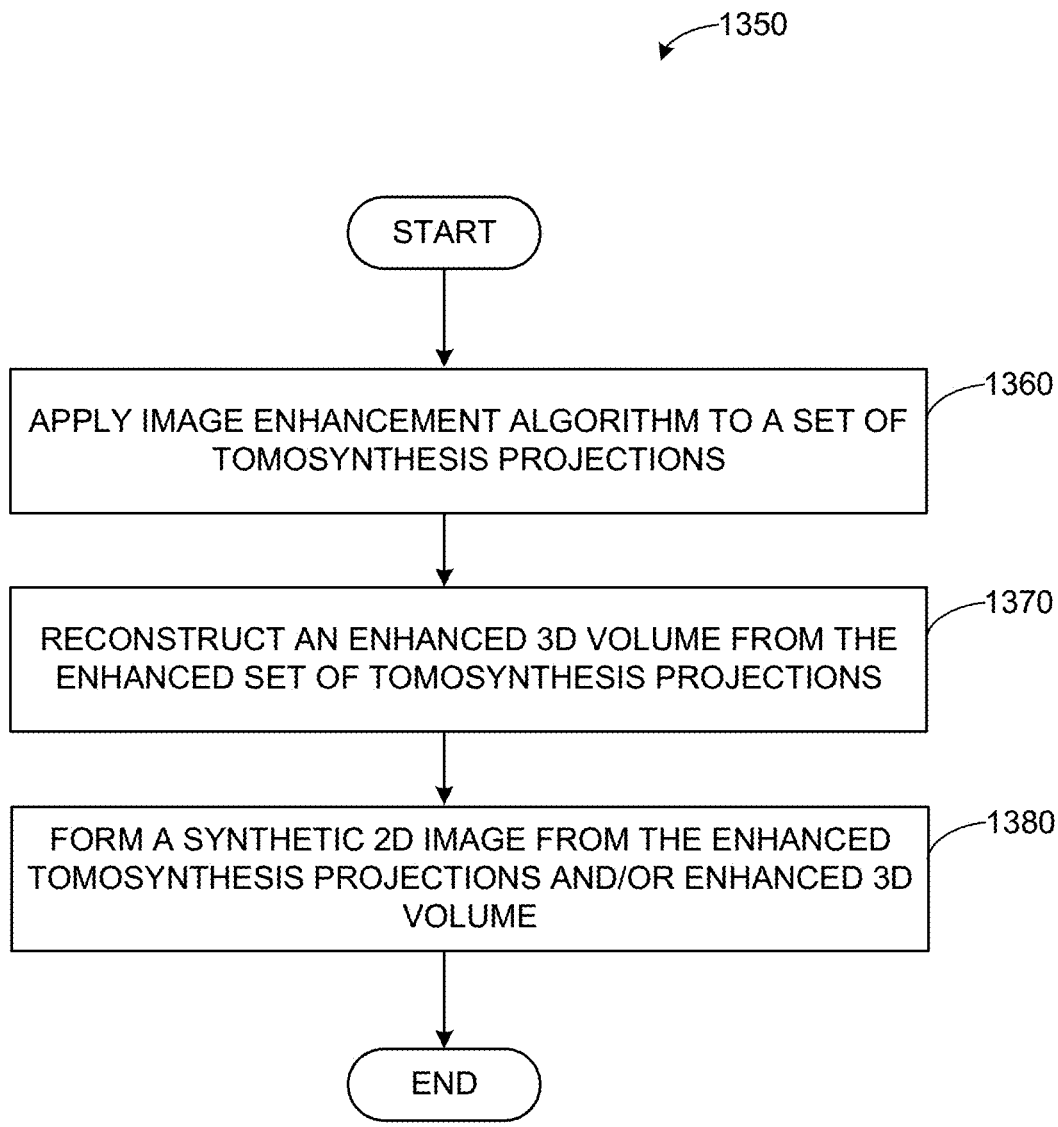

FIGS. 13A-13B are flowcharts representative of an example method 1300, 1350 to image an object, such as an organ of a patient, etc. At block 1310, a plurality of projection images are obtained of the organ and/or other object at a first level of energization. For example, a plurality of 2D tomosynthesis projection images are obtained of the organ by rotating the x-ray emitter 140 to a plurality of orientations relative to the organ and emitting a first level of x-ray energization from the emitter 140 for each projection image of the plurality of projection images.

At block 1320, an x-ray image is obtained of the object at a second level of x-ray energization. For example, an x-ray image, such as an FFDM image, etc., can be obtained of the organ using a greater level of x-ray energization than the level used to obtain the projection images.

At block 1330, an image enhancement algorithm is generated from a central tomosynthesis projection image based on a similarity metric between an output of the algorithm and a central projection. For example, an image enhancement algorithm is generated from the central tomosynthesis projection in the set of projections that tends to minimize or otherwise reduce the similarity metric between an output of the algorithm and the x-ray image. The training model 420 is used to form (e.g., train and test) the algorithm.

At block 1340, the generated algorithm is deployed in a model for synthetic image generation. For example, the image enhancement algorithm is deployed in a model 460 to generate synthetic images.

At block 1360, the image enhancement algorithm is applied to a set of tomosynthesis projections. For example, data obtained in the set of tomosynthesis projections is modified according to the image enhancement algorithm as instantiated in the model 460. Thus, pixel and/or other intensity values of the projections can be modified by passing them through the model 460 reflecting the image enhancement algorithm, for example.

At block 1370, an enhanced 3D volume is reconstructed from the enhanced set of tomosynthesis projections. For example, the set of 2D projections, enhanced by the algorithm of the model 460, is used to form a 3D volume.

At block 1380, a synthetic 2D image is formed from the enhanced projections and/or volume. For example, a 2D image can be synthesized from the enhanced tomosynthesis projections and/or reconstructed 3D volume to form a diagnostic image.

Figure 14A:
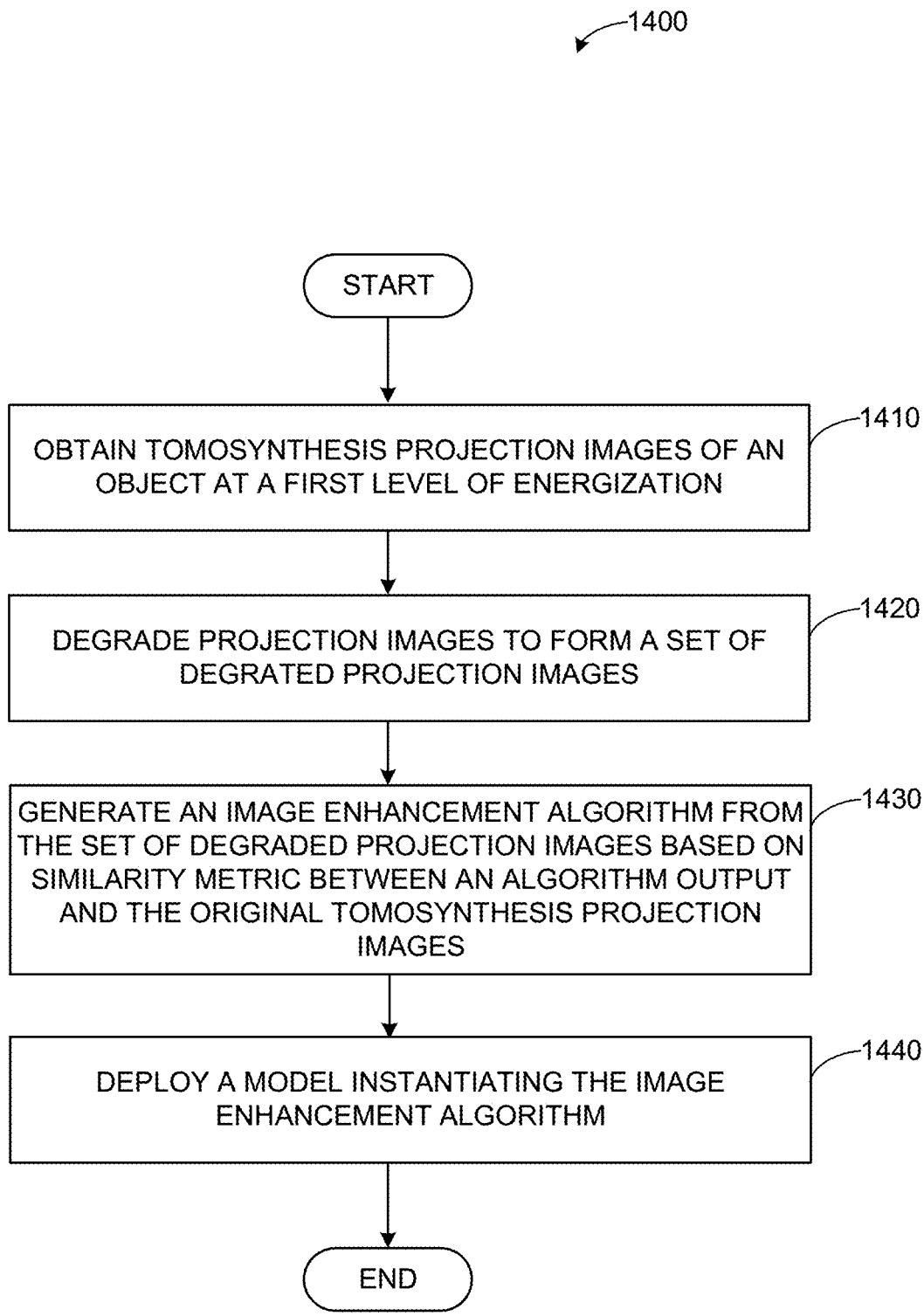
Figure 14B:
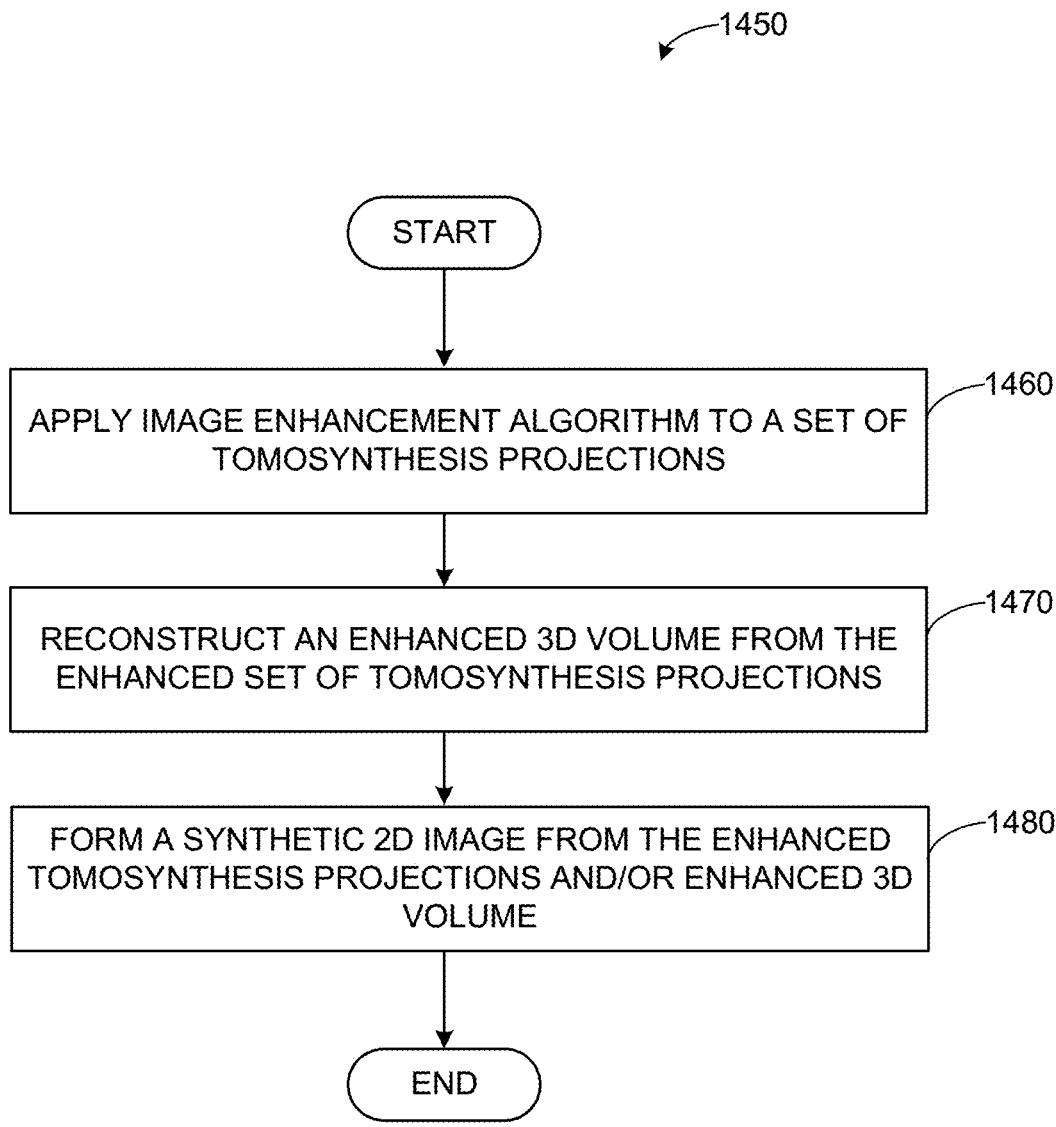

FIGS. 14A-14B are flowcharts representative of an example method 1400, 1450 to image an object, such as an organ of a patient, etc. At block 1410, a plurality of projection images are obtained of the organ and/or other object at a first level of energization. For example, a plurality of 2D tomosynthesis projection images are obtained of the organ by rotating the x-ray emitter 140 to a plurality of orientations relative to the organ and emitting a first level of x-ray energization from the emitter 140 for each projection image of the plurality of projection images.

At block 1420, the projection images are degraded to resemble projection images acquired at a lower level of energization. For example, the 2D tomosynthesis projection images are degraded (e.g., through introduction of noise, other filter, etc.) to appear as images acquired at a lower x-ray dose than that used to obtain the original set of projections.

At block 1430, an image enhancement algorithm is generated from the set of degraded projection images based on a similarity metric between an output of the algorithm and the original set of projections. For example, an image enhancement algorithm is generated from the set of degraded tomosynthesis projections that tends to minimize or otherwise reduce the similarity metric between an output of the algorithm and the original set of tomosynthesis projections. The training model 420 is used to form (e.g., train and test) the algorithm.

At block 1440, the generated algorithm is deployed in a model for synthetic image generation. For example, the image enhancement algorithm is deployed in a model 460 to generate synthetic images.

At block 1460, the image enhancement algorithm is applied to a set of tomosynthesis projections from a low-dose tomosynthesis acquisition. For example, data obtained in the set of tomosynthesis projections is modified according to the image enhancement algorithm as instantiated in the model 460. Thus, pixel and/or other intensity values of the projections can be modified by passing them through the model 460 reflecting the image enhancement algorithm, for example.

At block 1470, an improved 3D volume is reconstructed from the enhanced set of tomosynthesis projections. For example, the set of 2D projections, enhanced by the algorithm of the model 460, is used to form a 3D volume.

At block 1480, a synthetic 2D image is formed from the enhanced projections and/or volume. For example, a 2D image can be synthesized from the enhanced tomosynthesis projections and/or reconstructed 3D volume to form a diagnostic image.

Figure 15:
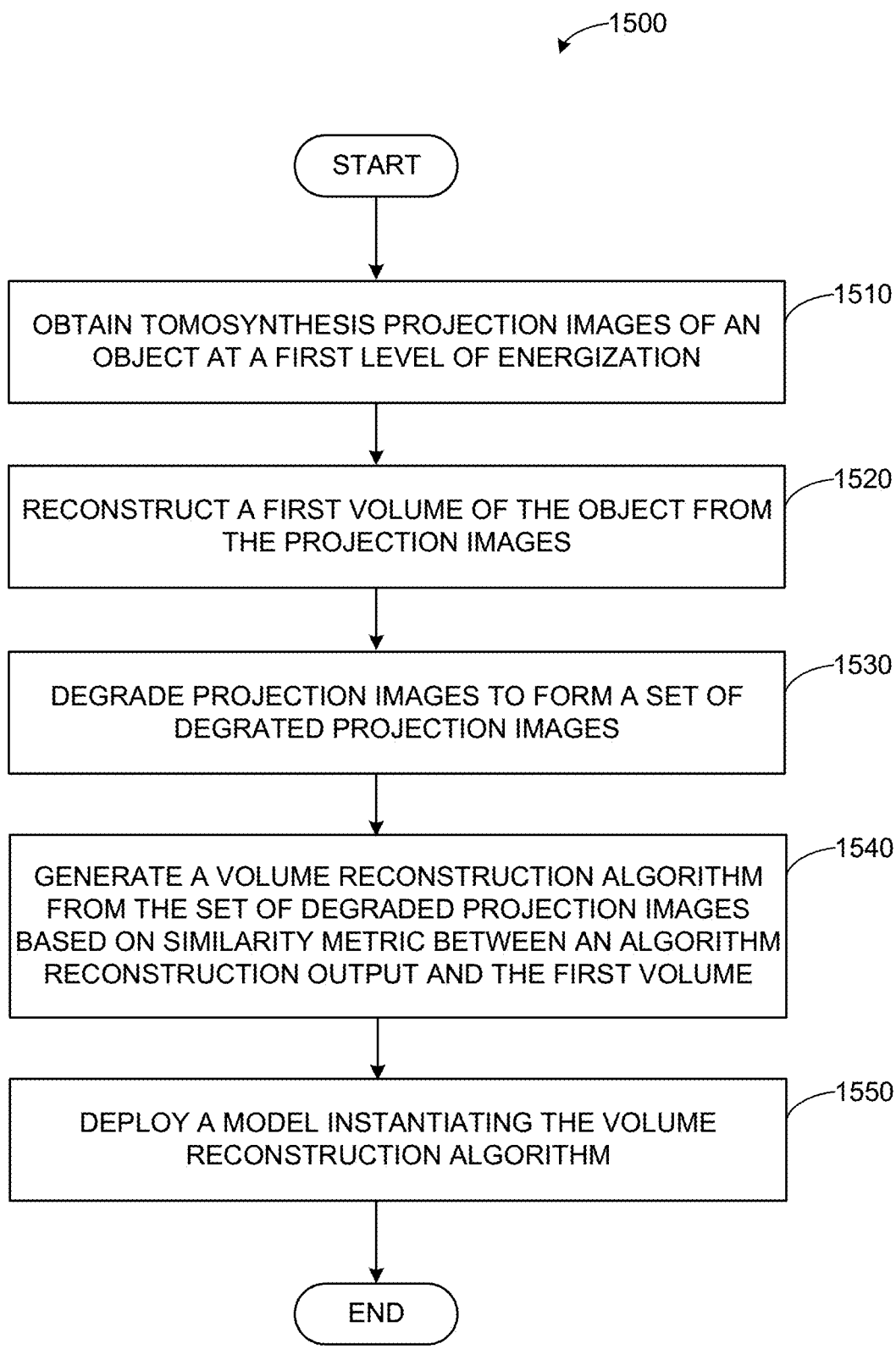

FIG. 15 is a flowchart representative of an example method 1500 to image an object, such as an organ of a patient, etc. At block 1510, a plurality of projection images are obtained of the organ and/or other object at a first level of energization. For example, a plurality of 2D tomosynthesis projection images are obtained of the organ by rotating the x-ray emitter 140 to a plurality of orientations relative to the organ and emitting a first level of x-ray energization from the emitter 140 for each projection image of the plurality of projection images.

At block 1520, a first volume of the object is reconstructed from the projection images. For example, a 3D volume of the organ can be reconstructed from the plurality of 2D tomosynthesis projection images.

At block 1530, the projection images are degraded to resemble projection images acquired at a lower level of energization. For example, the 2D tomosynthesis projection images are degraded (e.g., through introduction of noise, other filter, etc.) to appear as images acquired at a lower x-ray dose than that used to obtain the original set of projections.

At block 1540, a volume reconstruction algorithm is generated from the degraded projection images based on a similarity metric between a reconstruction output of the algorithm and the first volume. For example, a volume reconstruction algorithm is generated from the degraded tomosynthesis projections that tends to minimize or otherwise reduce the similarity metric between a second volume output from the reconstruction algorithm and the first volume reconstruction. The training model 420 is used to form (e.g., train and test) the algorithm.

At block 1550, the generated algorithm is deployed in a model for synthetic image generation. For example, the volume reconstruction algorithm is deployed in a model 460 to generate synthetic images.

Figure 16:
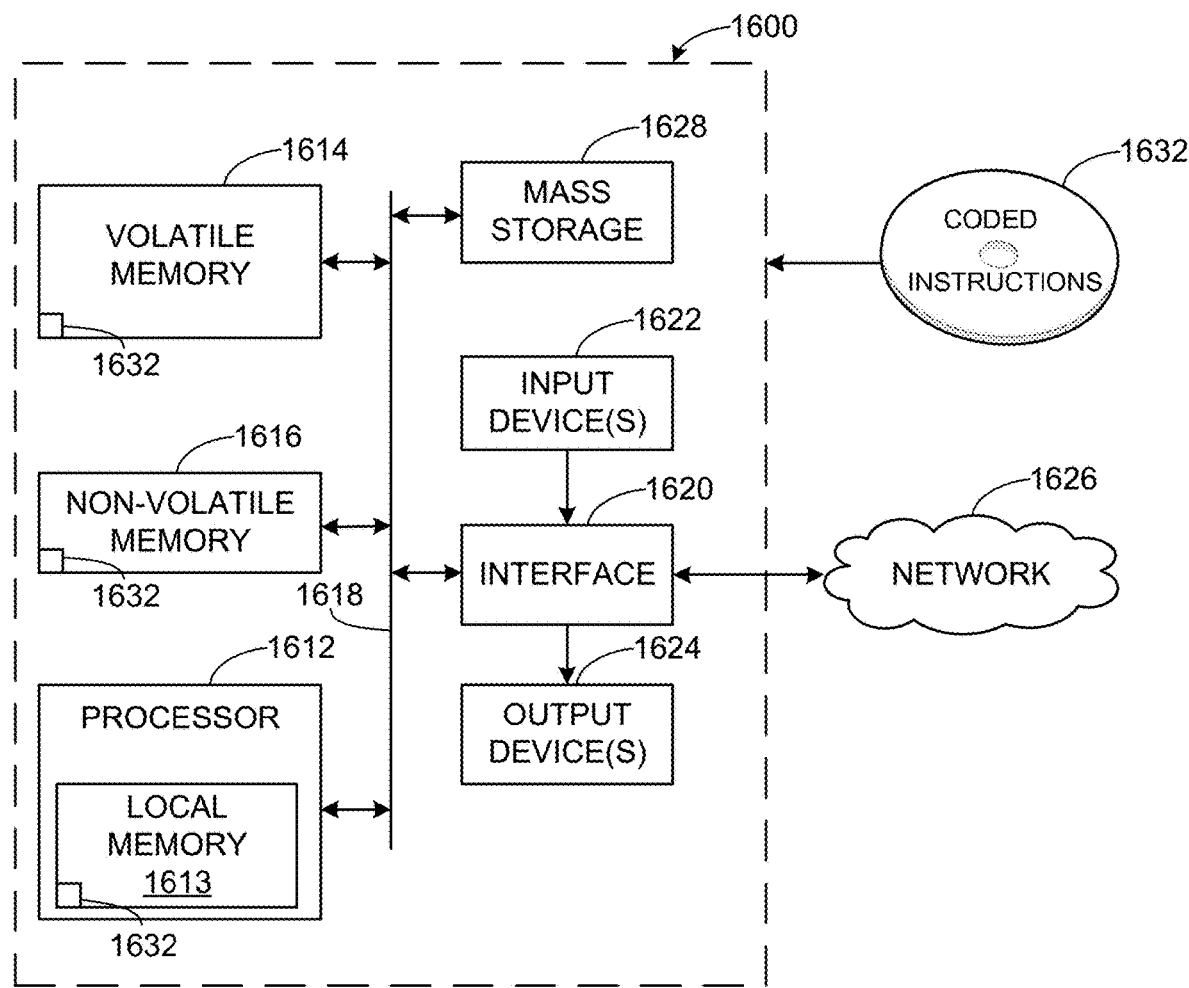
FIG. 16 is a processor diagram which can be used to implement the methods of FIGS. 11-15.

FIG. 16 is a block diagram of an example processor platform 1600 capable of executing the instructions of FIGS. 11-15 to implement the example system 300 of FIGS. 1-10. The processor platform 1600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 11-15 may be stored in the mass storage device 1628, in the volatile memory 1614, in the non-volatile memory 1616, and/or on a removable tangible computer readable storage medium such as a CD or DVD.

From the foregoing, it will appreciate that the above disclosed methods, apparatus and articles of manufacture facilitate improved image reconstruction and generation of 2D and/or 3D images from projection data, such as DBT projection data. Certain examples facilitate improved modeling of image information to facilitate synthetic 2D image generation from available projection information. Certain examples alleviate dependence on particular equations to instead leverage modeling and learning to generate 2D and/or 3D images from available image projection information. Certain examples facilitate improved application of artificial intelligence techniques to image reconstruction. Certain examples provide technological improvement to processors configured for modeling, processing, and reconstruction of image data, such as 2D and/or 3D images generated from image projection data (e.g., DBT, etc.), etc.

For example, in DBT/CE-DBT, reconstruction directly impacts content of the data for radiologists to review, and, therefore, impacts a resulting diagnosis. While today's algorithms tend to optimize the quality of reconstructed slices (e.g., reducing the noise, mitigating streaking artifacts, etc.), a prior knowledge introduced in these algorithms usually only partially address defects resulting in non-perfect reconstructed data. Additionally, these sophisticated algorithms are usually complex and require significant computational power. Consequently, the design of an ideal reconstruction is limited by the know-how of the algorithm designer. However, for a given voxel, a reconstruction algorithm can simply be seen as a mapping function that associates a reconstructed gray level to a set of input gray levels extracted from the projections.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. At least one non-transitory computer-readable storage medium including instructions that, when executed, cause at least one processor to at least:
   obtain a plurality of two-dimensional (2D) tomosynthesis projection images of an organ by rotating an x-ray emitter to a plurality of orientations relative to the organ and emitting a first level of x-ray energization from the emitter for each projection image of the plurality of 2D tomosynthesis projection images;
   reconstruct a three-dimensional (3D) volume of the organ from the plurality of 2D tomosynthesis projection images;
   obtain an x-ray image of the organ with a second level of x-ray energization;
   generate a synthetic 2D image generation learning algorithm from the plurality of two-dimensional (2D) tomosynthesis projection images and the reconstructed 3D volume based on a similarity metric between the synthetic 2D image and the x-ray image; and
   deploy an artificial intelligence model instantiating the synthetic 2D image generation learning algorithm to form a synthetic image.

2. The at least one computer-readable storage medium of claim 1, wherein the x-ray image is to be registered to fit in a geometry of the plurality of 2D tomosynthesis projection images.

3. The at least one computer-readable storage medium of claim 1, wherein the plurality of 2D tomosynthesis projection images of the organ and the x-ray image of the organ are to be obtained during a same compression of the organ.

4. The at least one computer-readable storage medium of claim 1, wherein the plurality of 2D tomosynthesis projection images and the x-ray image are further to be obtained with a detector that receives x-rays emitted from the x-ray emitter, the instructions, when executed, to further cause the at least one processor to:
   applying a dynamic range correction factor to at least one of the plurality of 2D projection images or the x-ray image.

5. The at least one computer-readable storage medium of claim 1, wherein each plane of the reconstructed 3D volume is to match with a geometry of the x-ray image.

6. The at least one computer-readable storage medium of claim 1, wherein the instructions, when executed, further cause the at least one processor to:
map each pixel of the synthetic 2D image to at least one voxel in the reconstructed 3D volume;
present the synthetic 2D image in a graphical user interface (GUI) generated on a graphical display;
receive a user selection of an object of interest in the x-ray image;
identify at least one plane through the 3D volume; and
present the at least one identified plane on the graphical display.

7. The at least one computer-readable storage medium of claim 1, wherein the instructions, when executed, further cause the at least one processor to:
enhance the synthetic 2D image with the areas extracted from the reconstructed 3D volume; and
enrich a mapping of the synthetic 2D image to the reconstructed 3D volume with the location of the extracted areas.

8. The at least one computer-readable storage medium of claim 1, wherein the instructions, when executed, further cause the at least one processor to:
enhance the x-ray image with the areas extracted from the reconstructed 3D volume,
wherein the synthetic 2D image generation learning algorithm is generated from the reconstructed 3D volume based on a similarity metric between the synthetic 2D image and the enhanced x-ray image.

9. The at least one computer-readable storage medium of claim 1, wherein an energy to obtain the x-ray image is higher than an energy to obtain the plurality of two-dimensional (2D) tomosynthesis projection images.

10. The at least one computer-readable storage medium of claim 1, wherein generating the synthetic 2D image generation learning algorithm includes determining the synthetic 2D image generation learning algorithm using a training model such that the synthetic 2D image generation learning algorithm tends to minimize the similarity metric between the synthetic 2D image and the x-ray image.

11. The at least one computer-readable storage medium of claim 1, wherein the model includes an artificial neural network model.

12. The at least one computer-readable storage medium of claim 8, wherein the areas extracted from the reconstructed 3D volume are provided by at least one of an operator or a computer-aided detection system.

* * * * *